Sept. 22, 1959  R. J. VAN VICK ET AL  2,905,065
PROCESS AND MACHINE FOR PRODUCING CARTONS
Filed Jan. 24, 1956  24 Sheets-Sheet 8
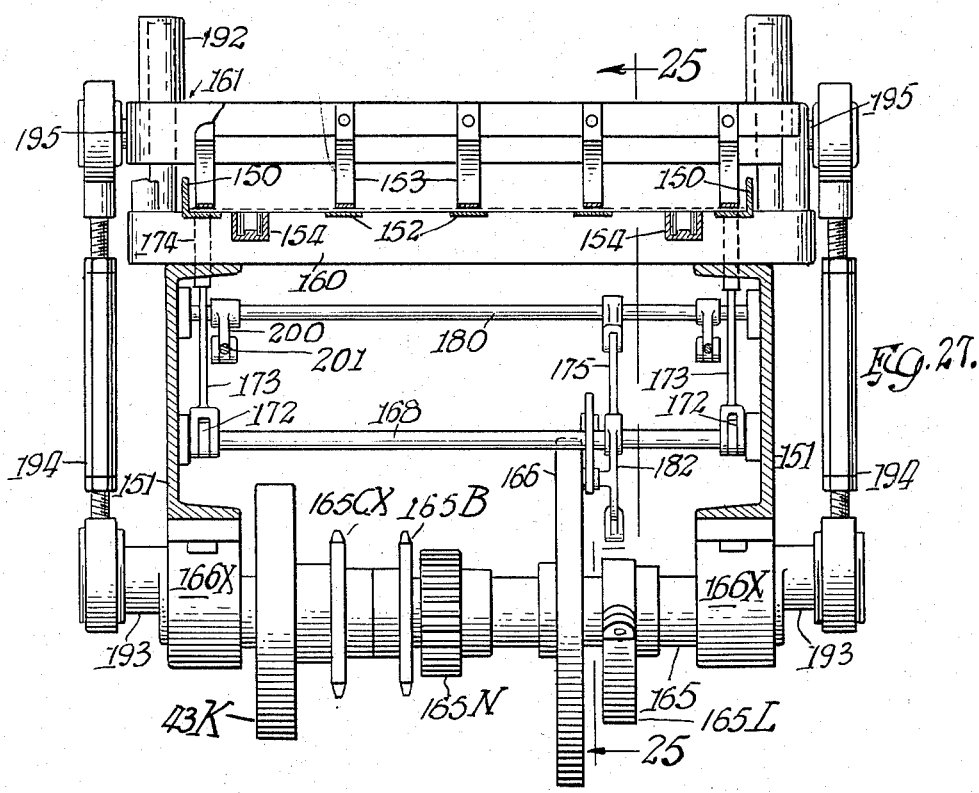
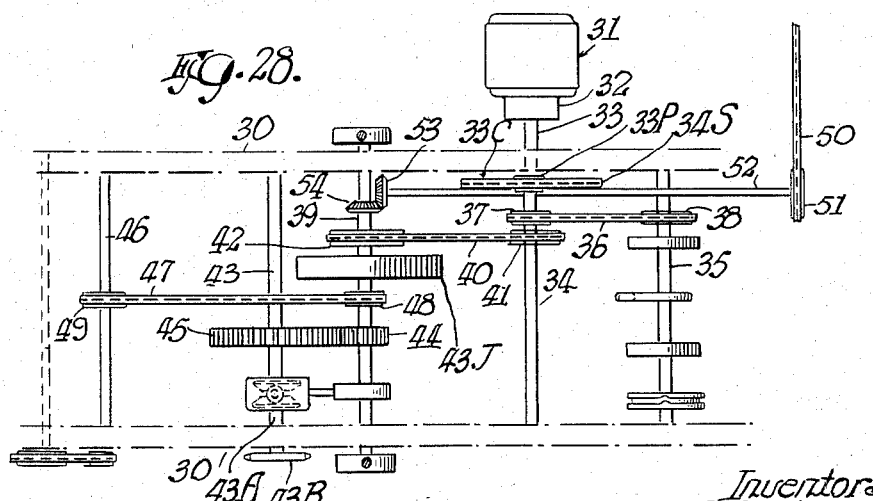

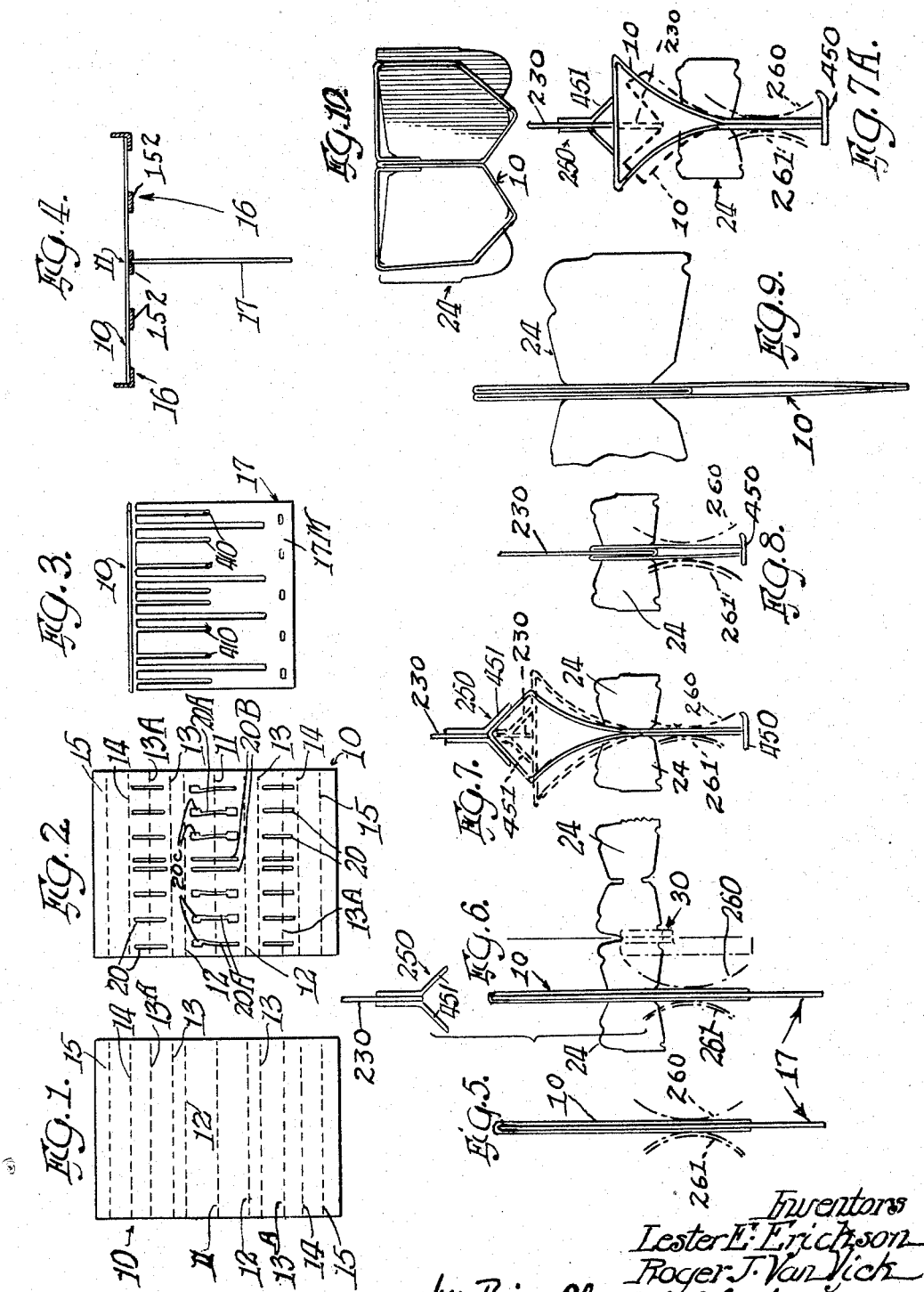

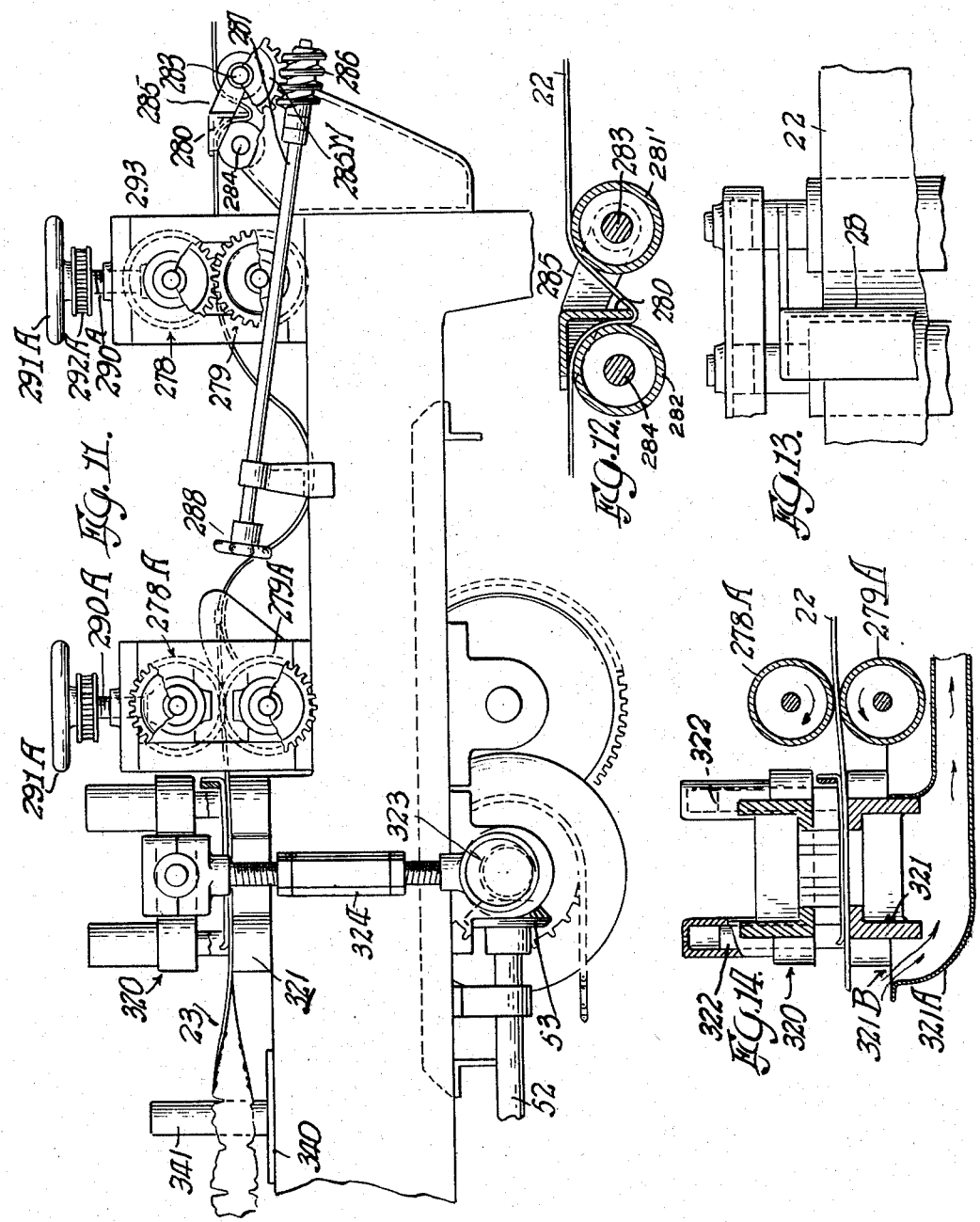

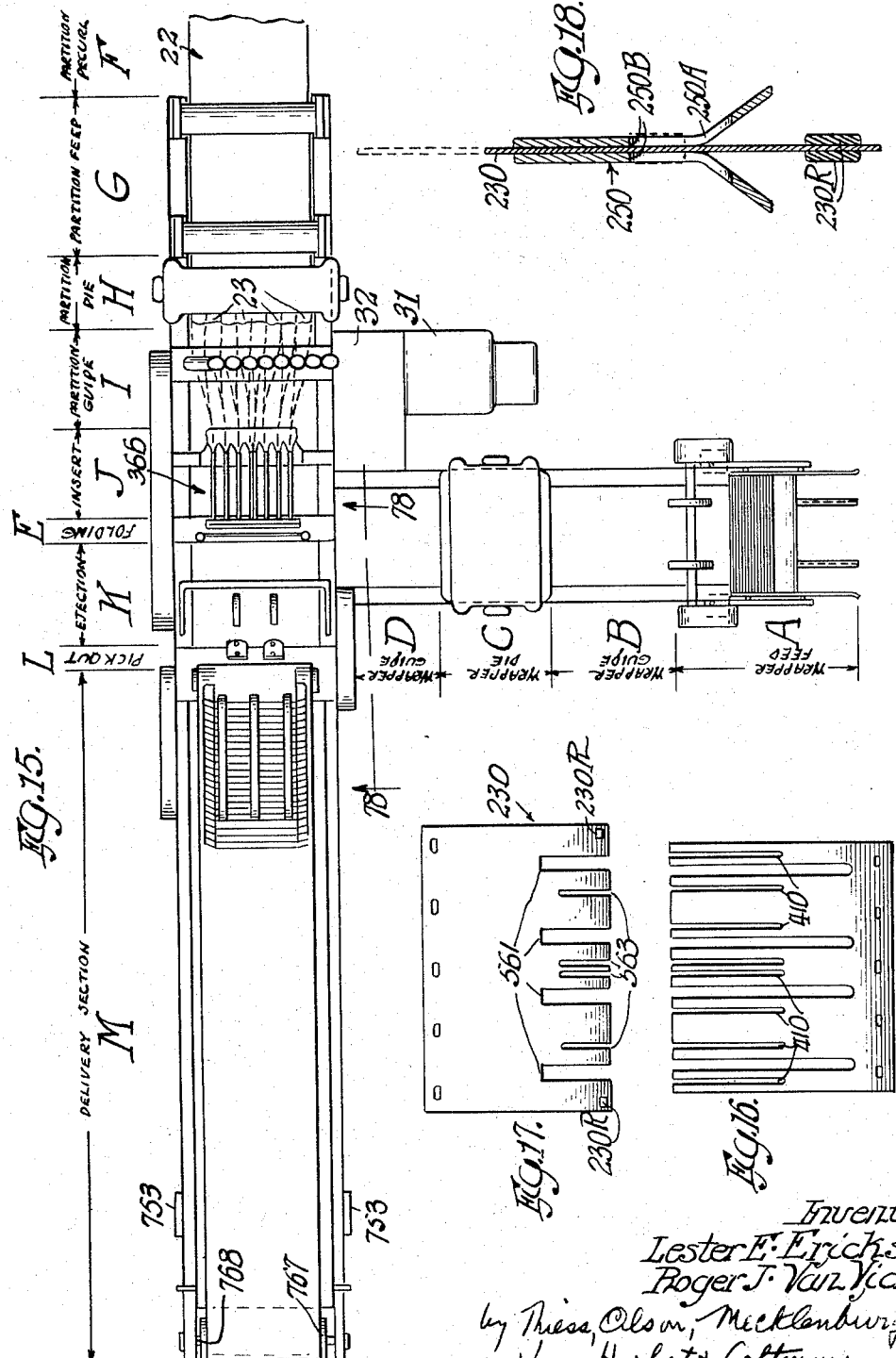

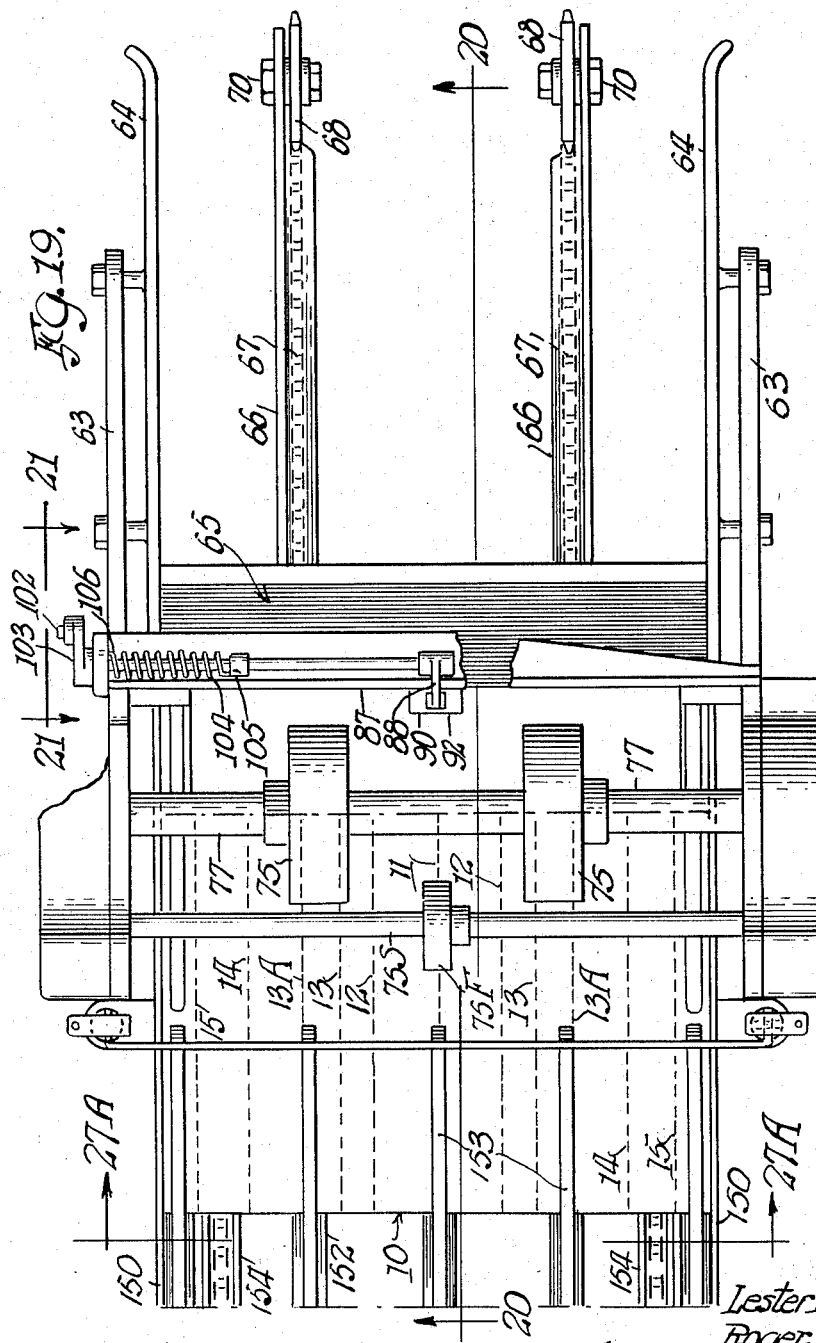

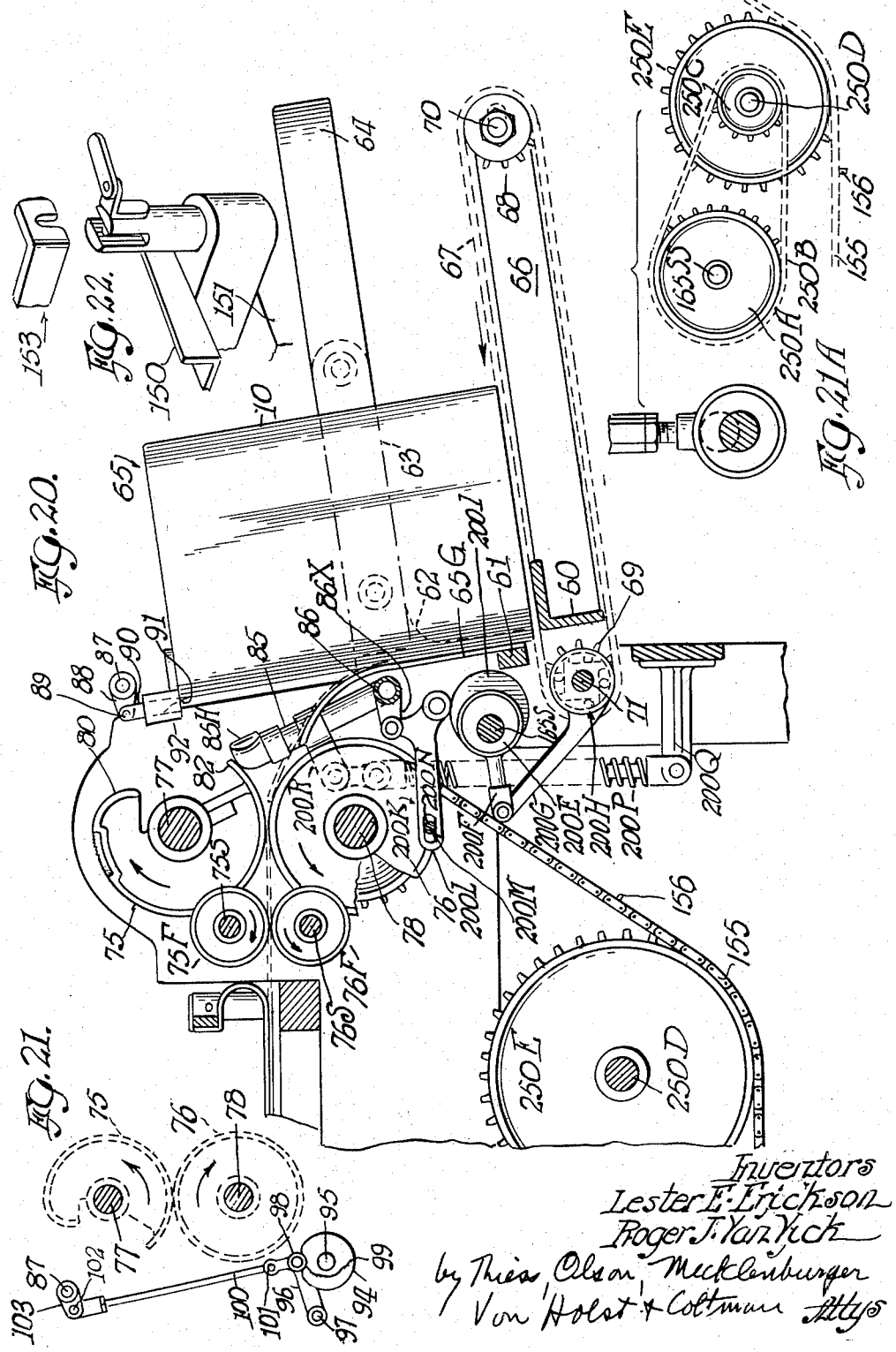

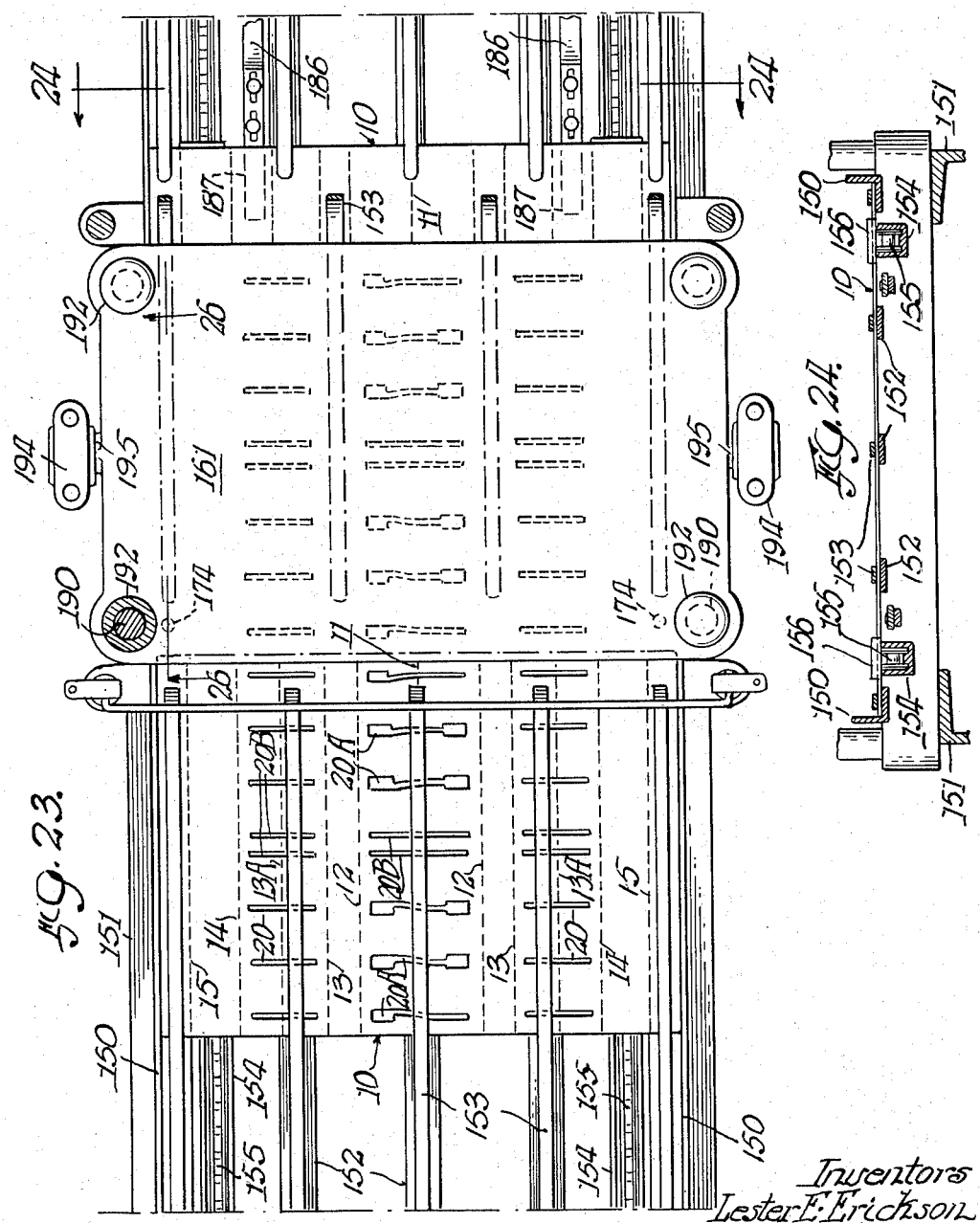

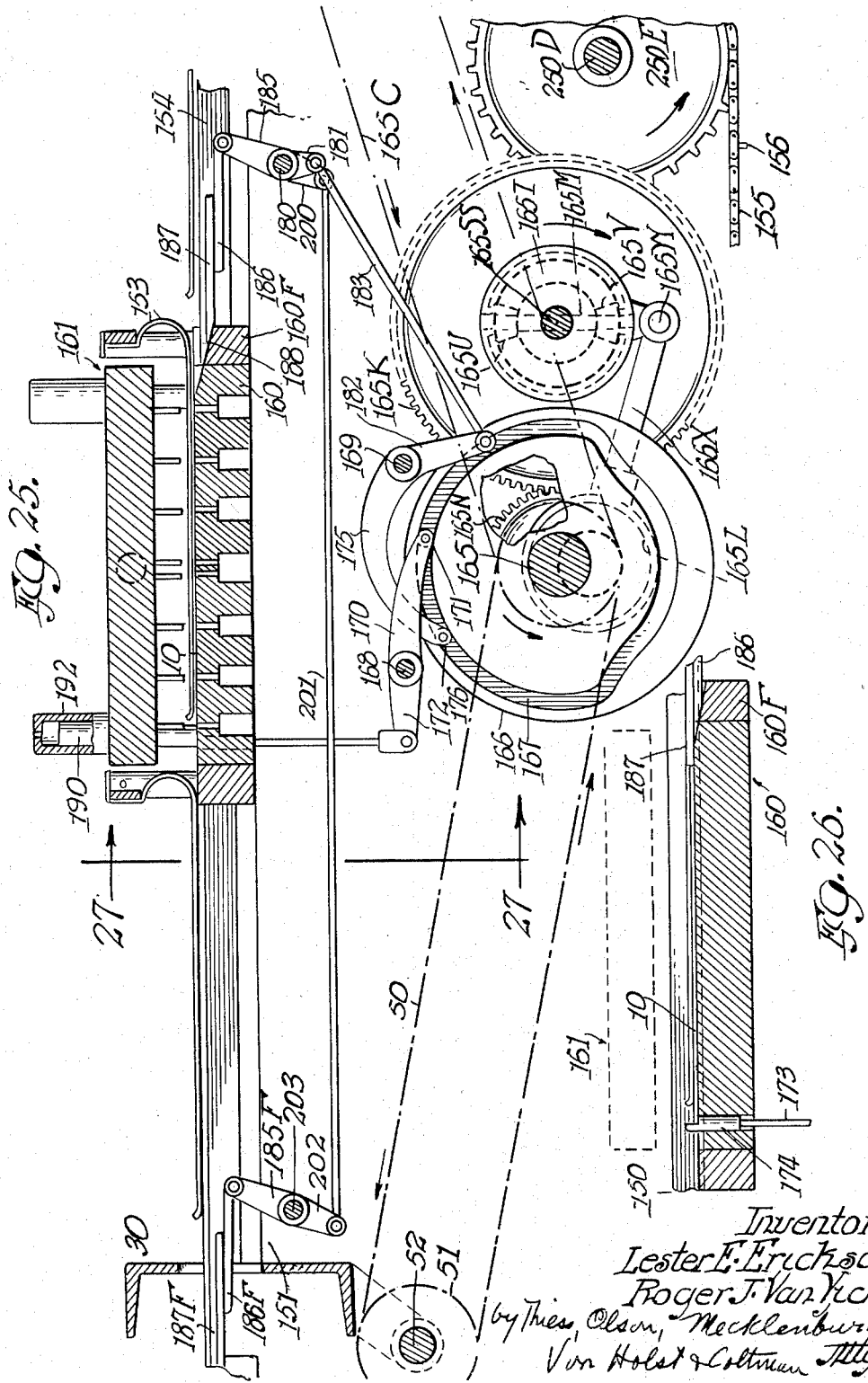

Sept. 22, 1959   R. J. VAN VICK ET AL   2,905,065
PROCESS AND MACHINE FOR PRODUCING CARTONS
Filed Jan. 24, 1956   24 Sheets-Sheet 9

Inventors
Lester E. Erickson
Roger J. Van Vick
by Thiess, Olson, Mecklenburger
Von Holst & Coltman
Attys

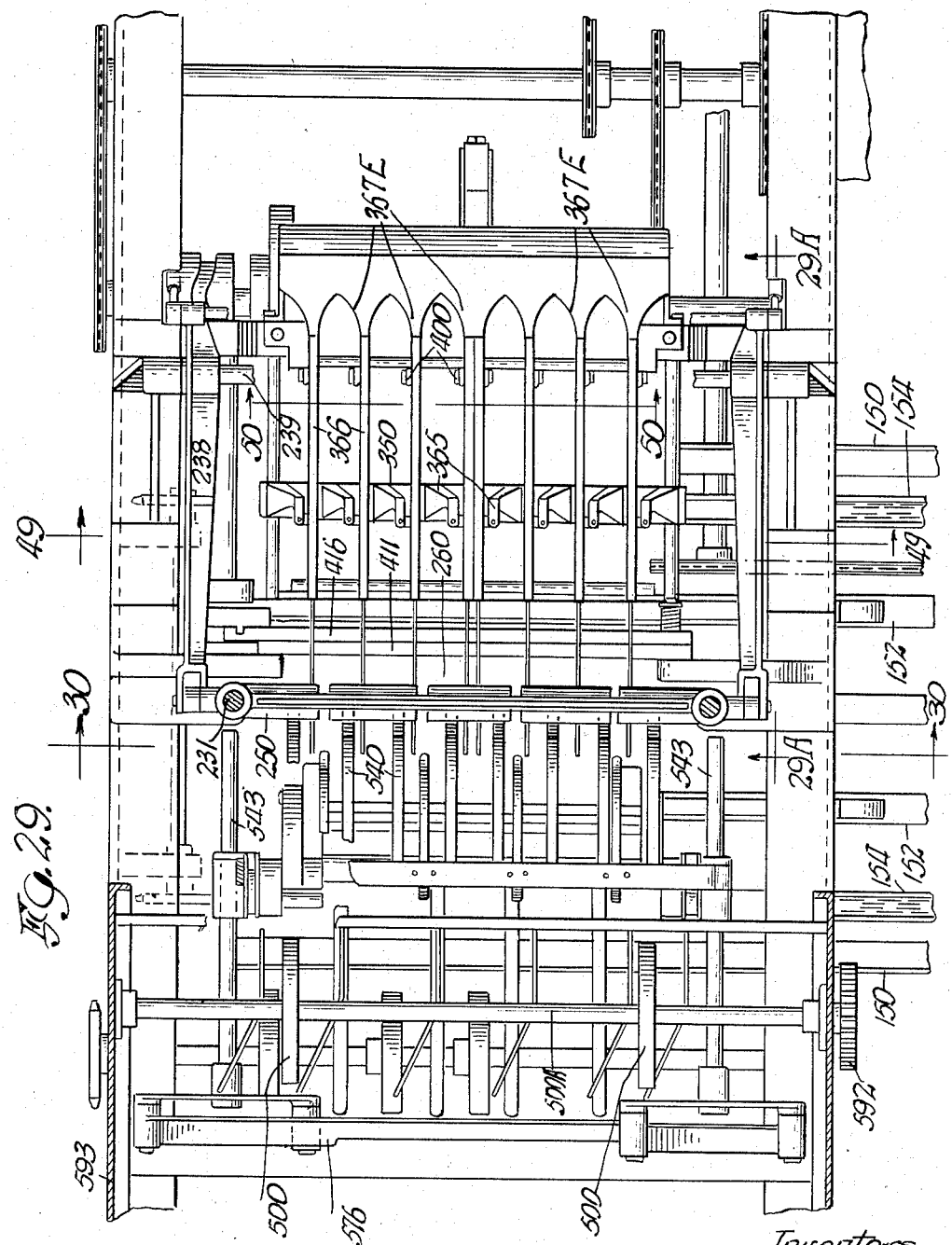

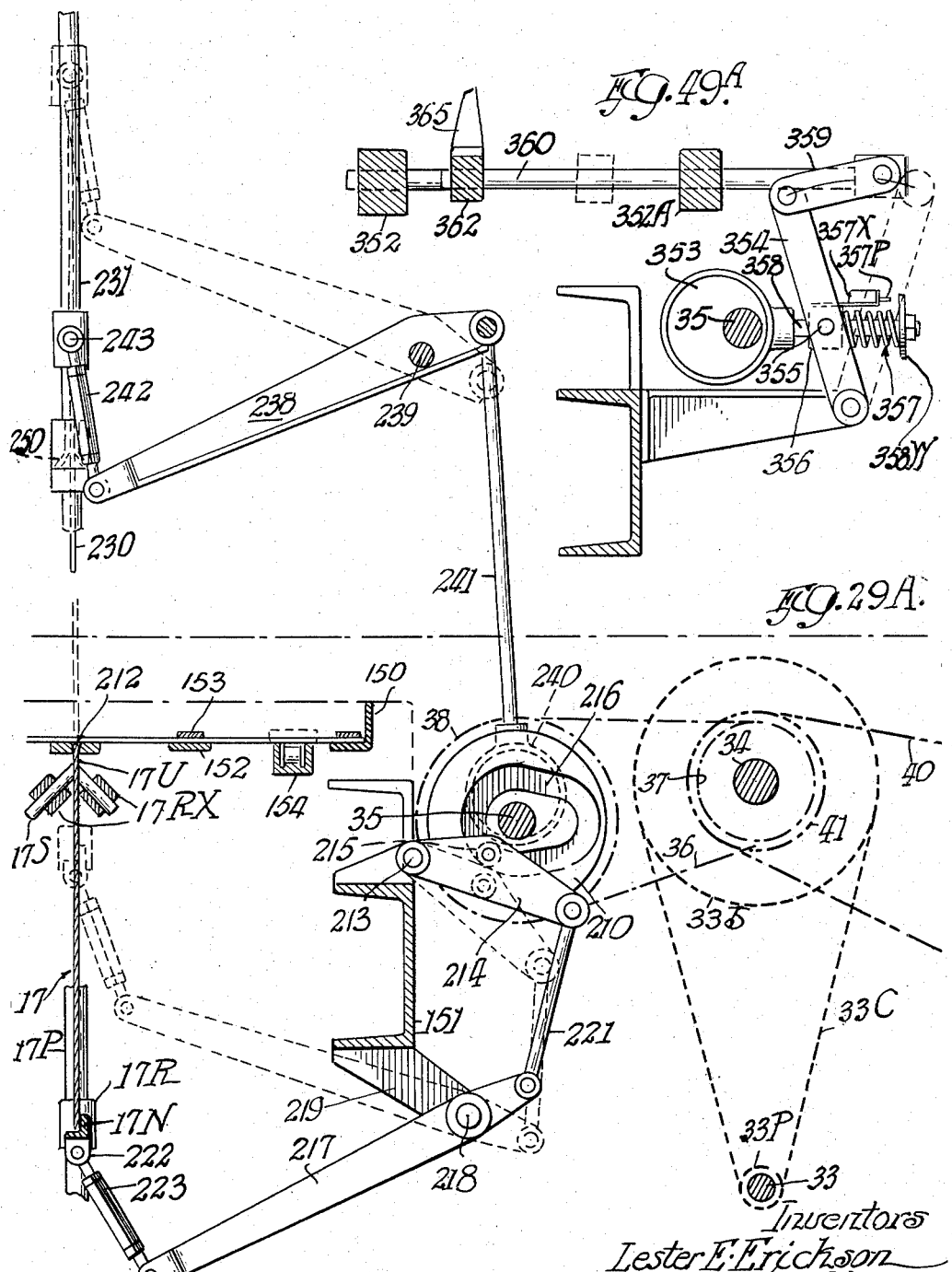

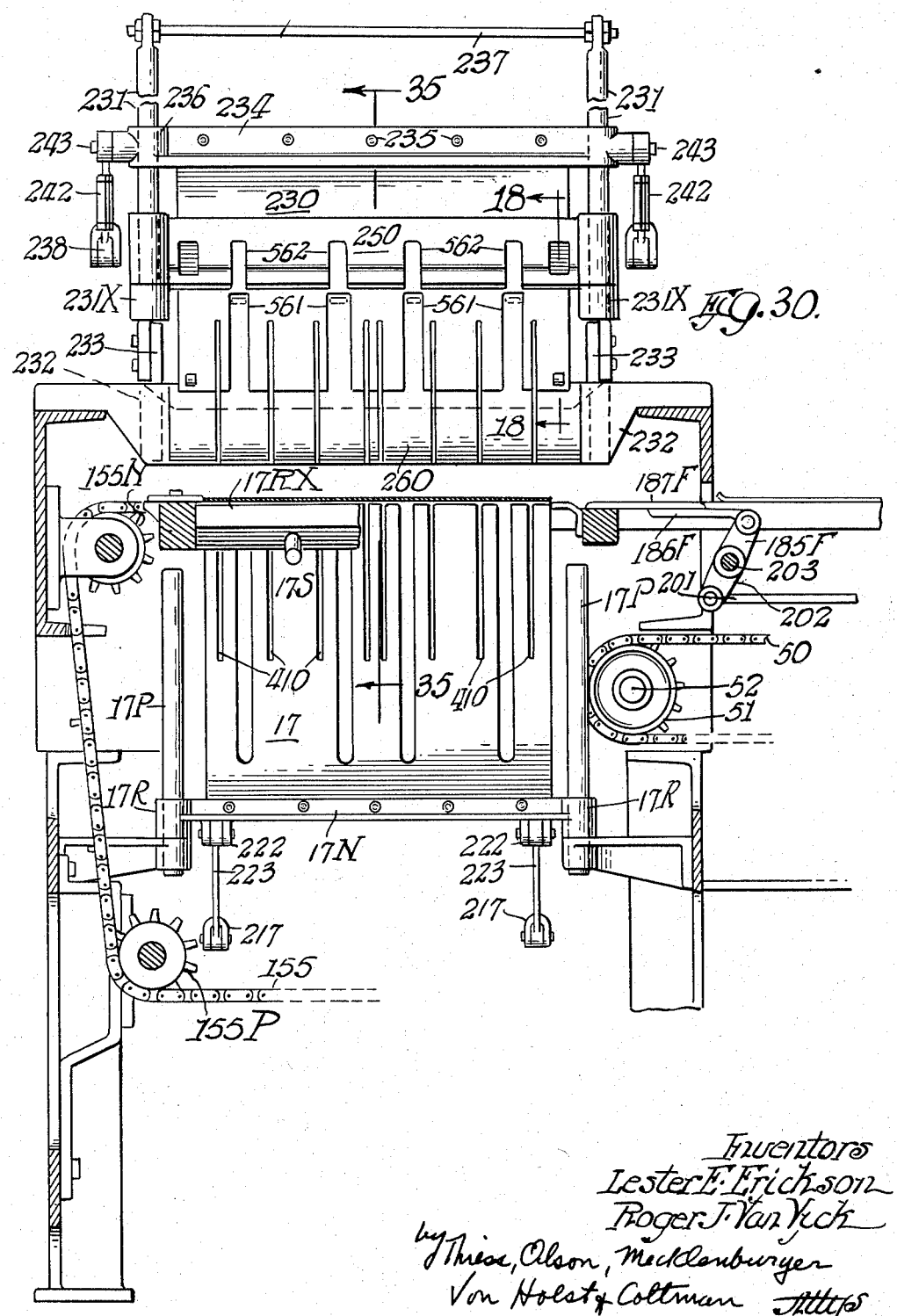

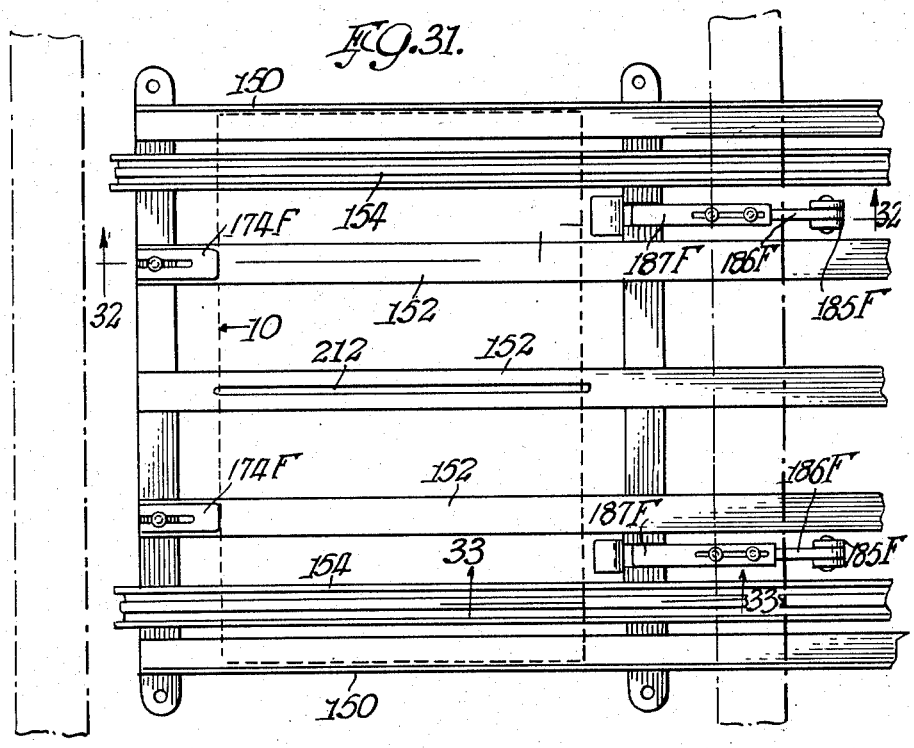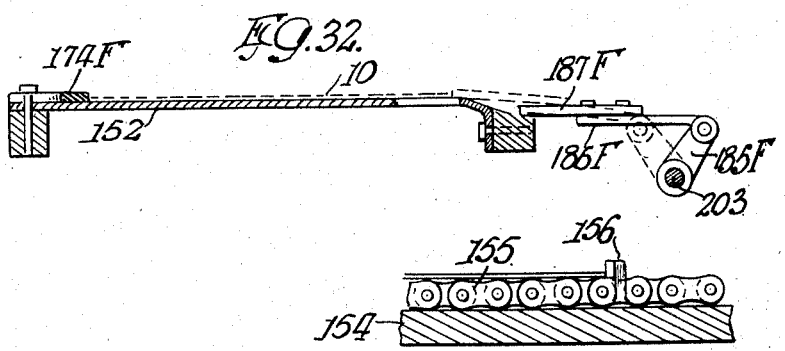

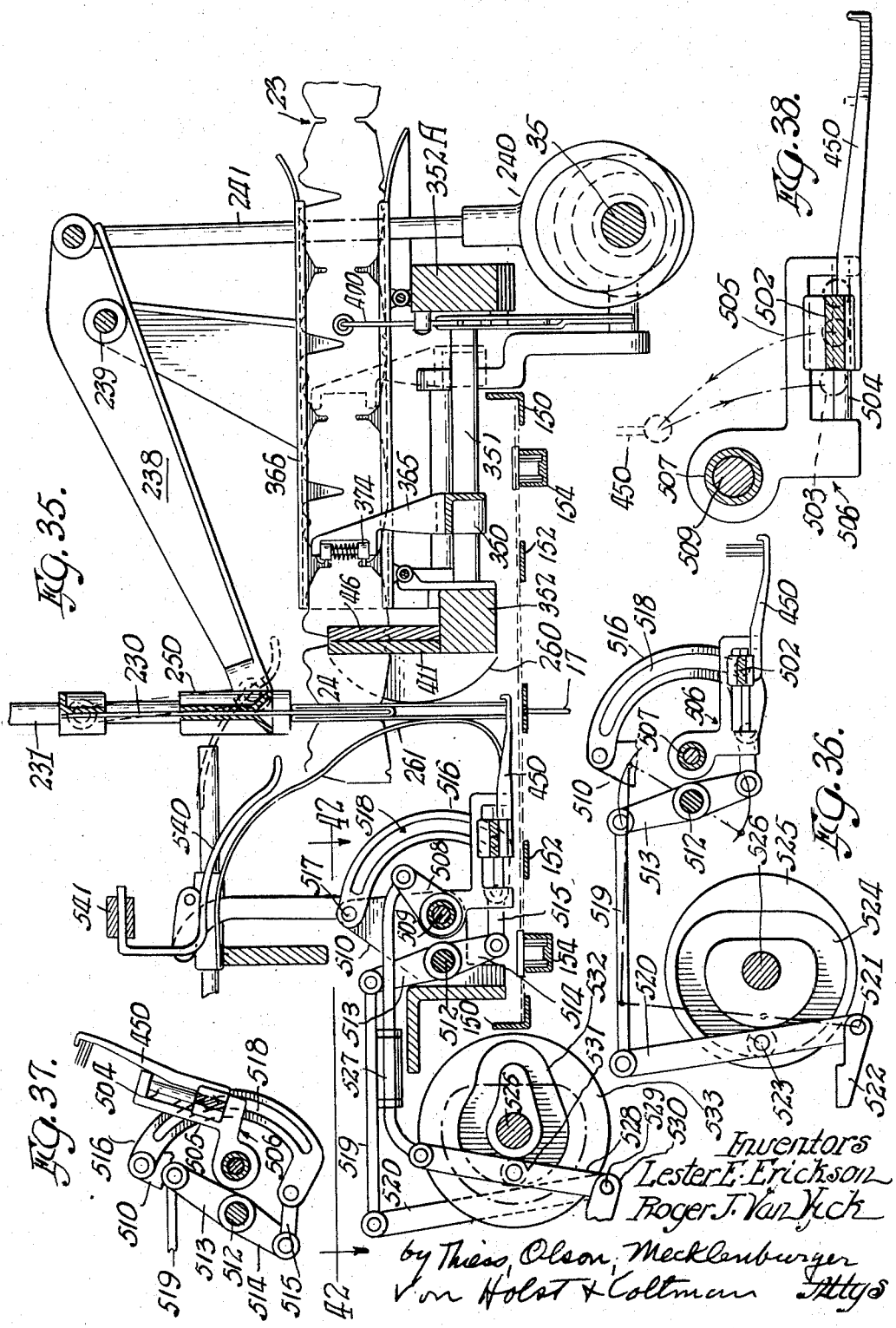

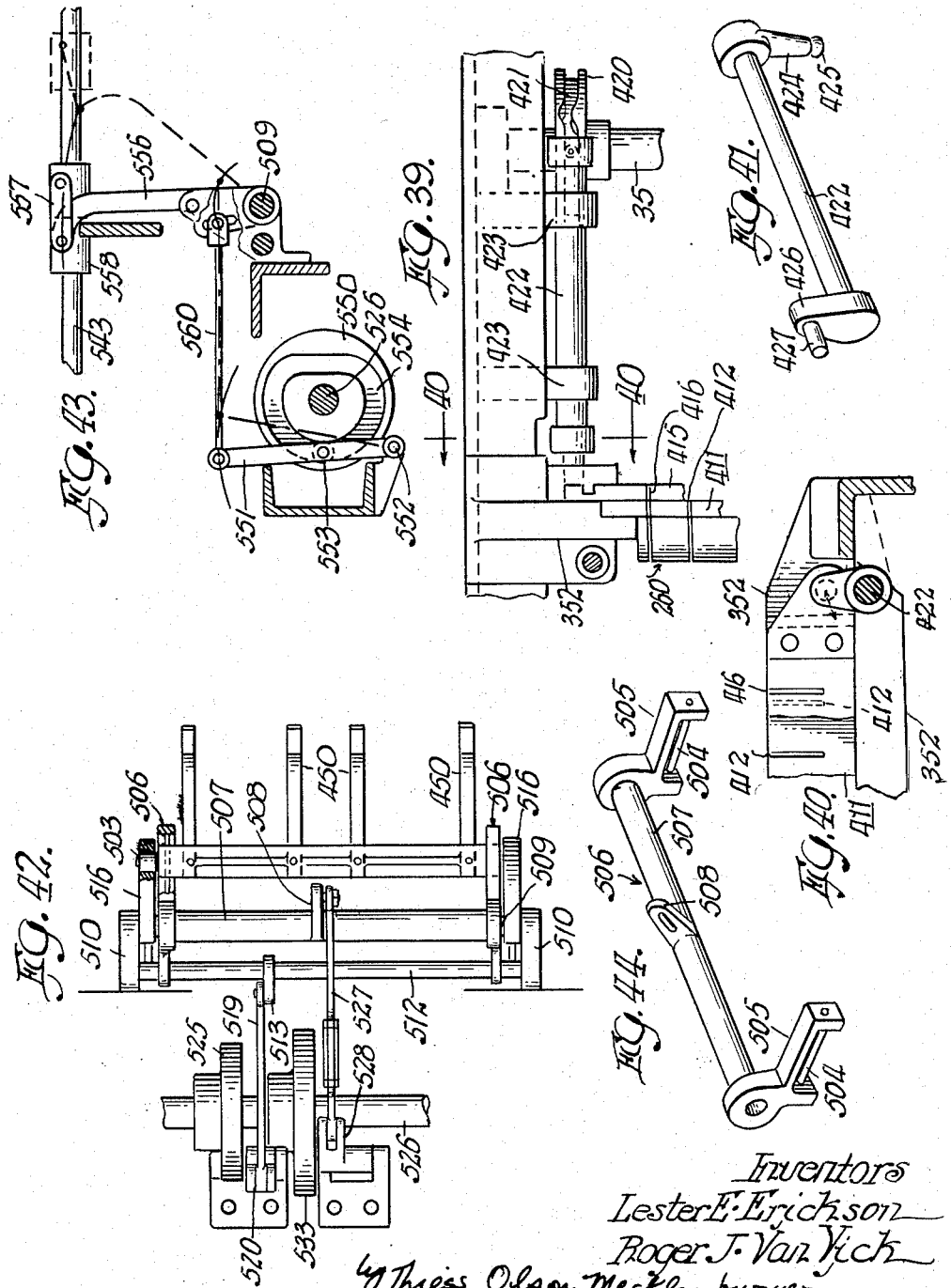

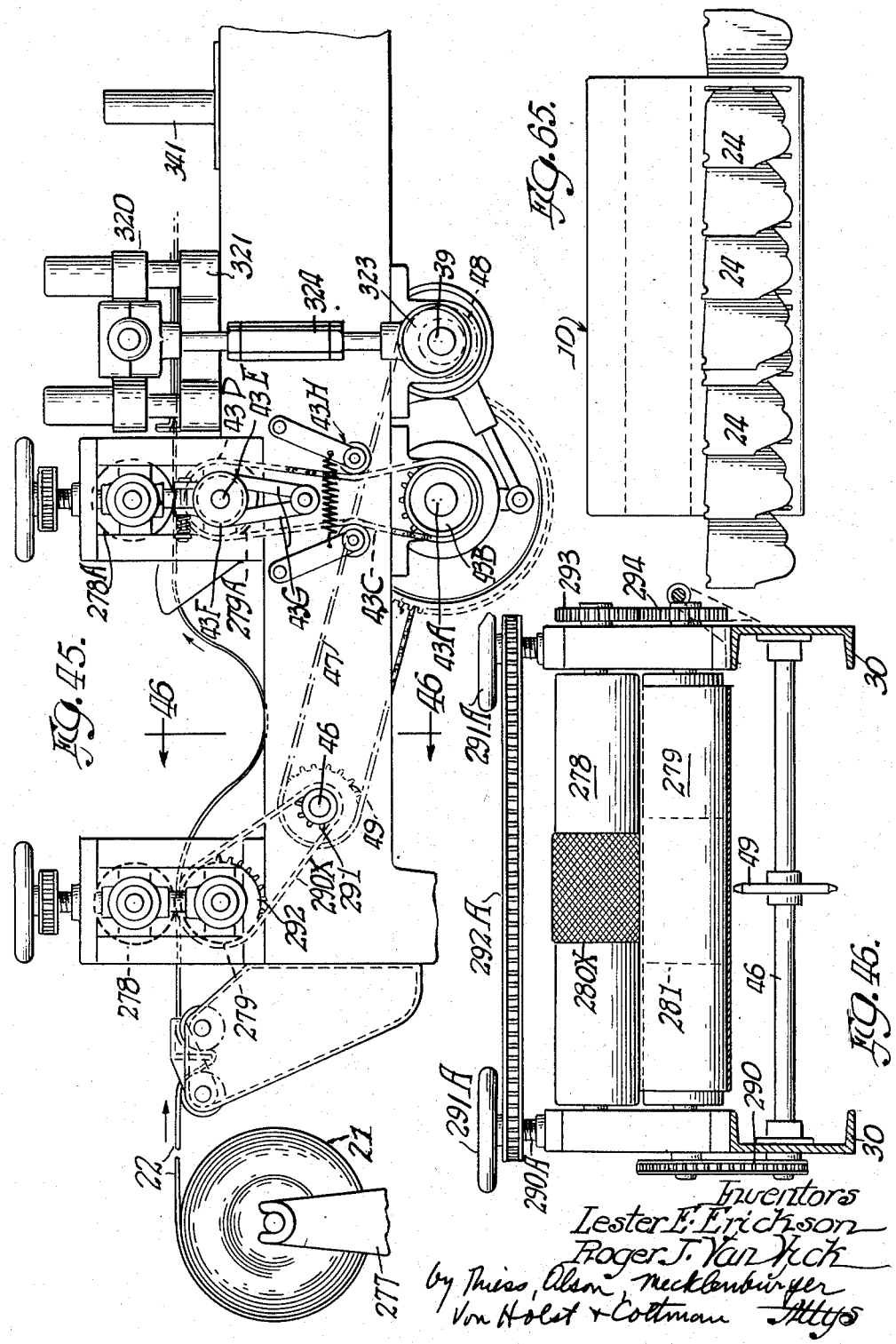

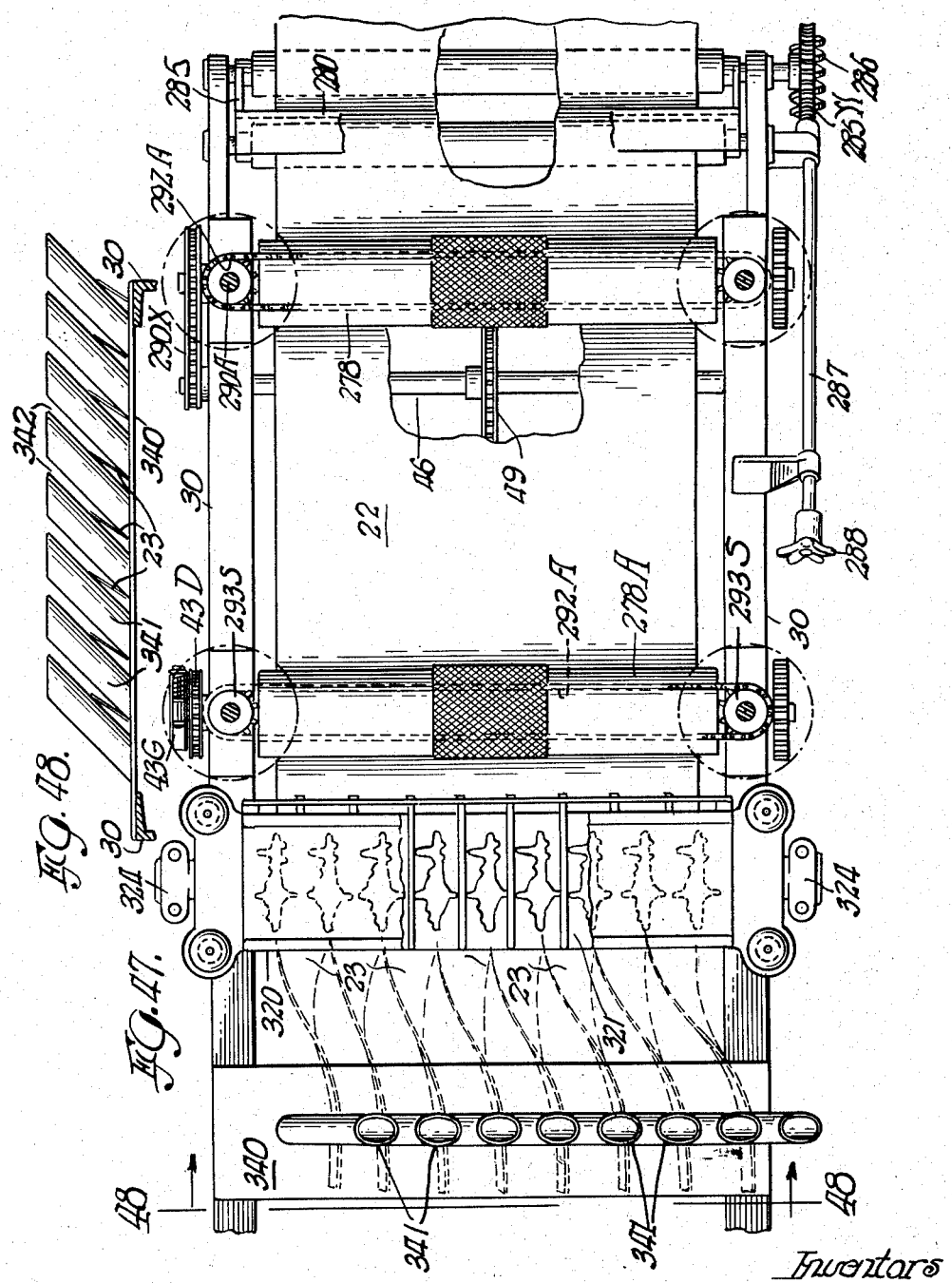

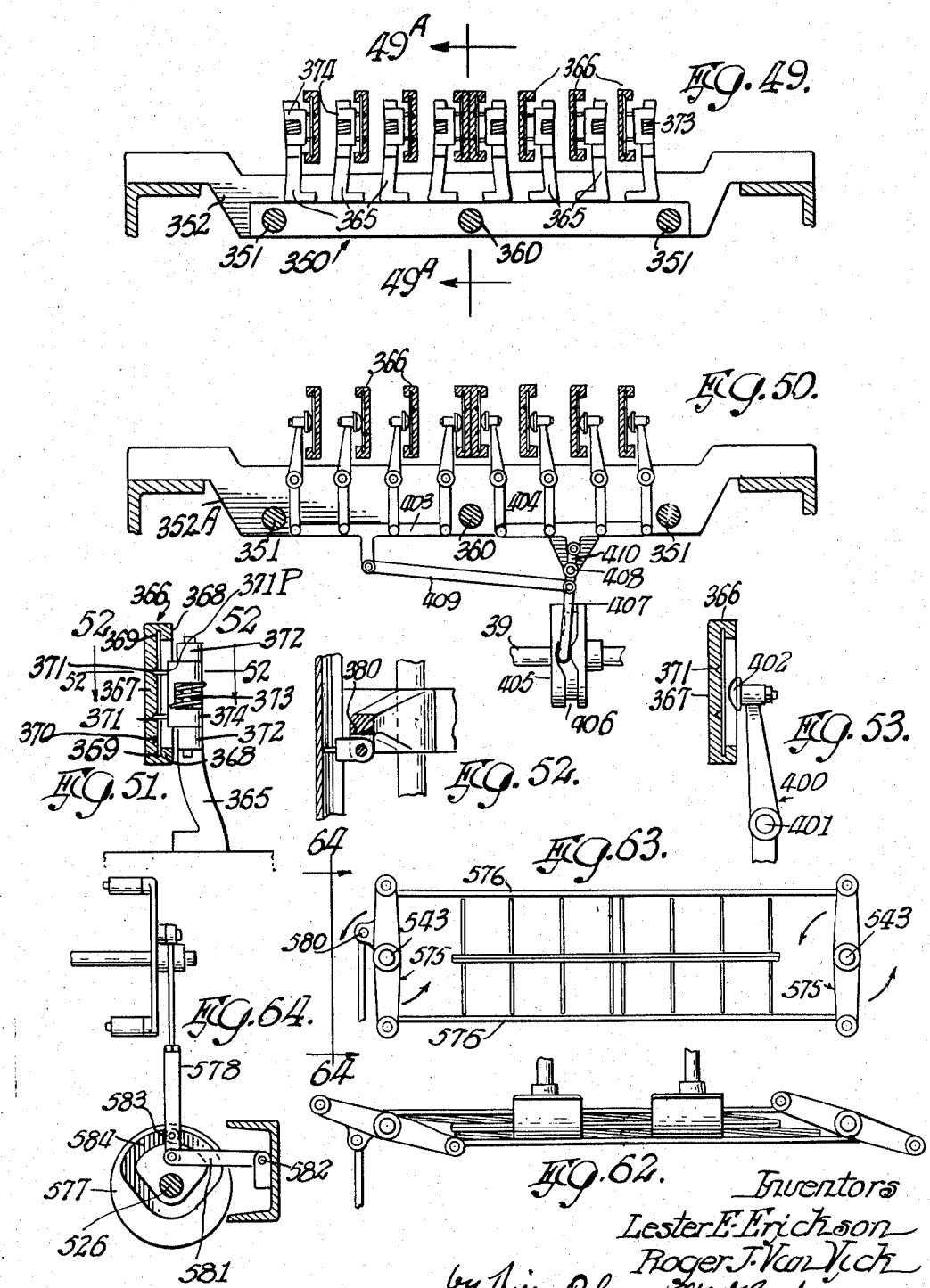

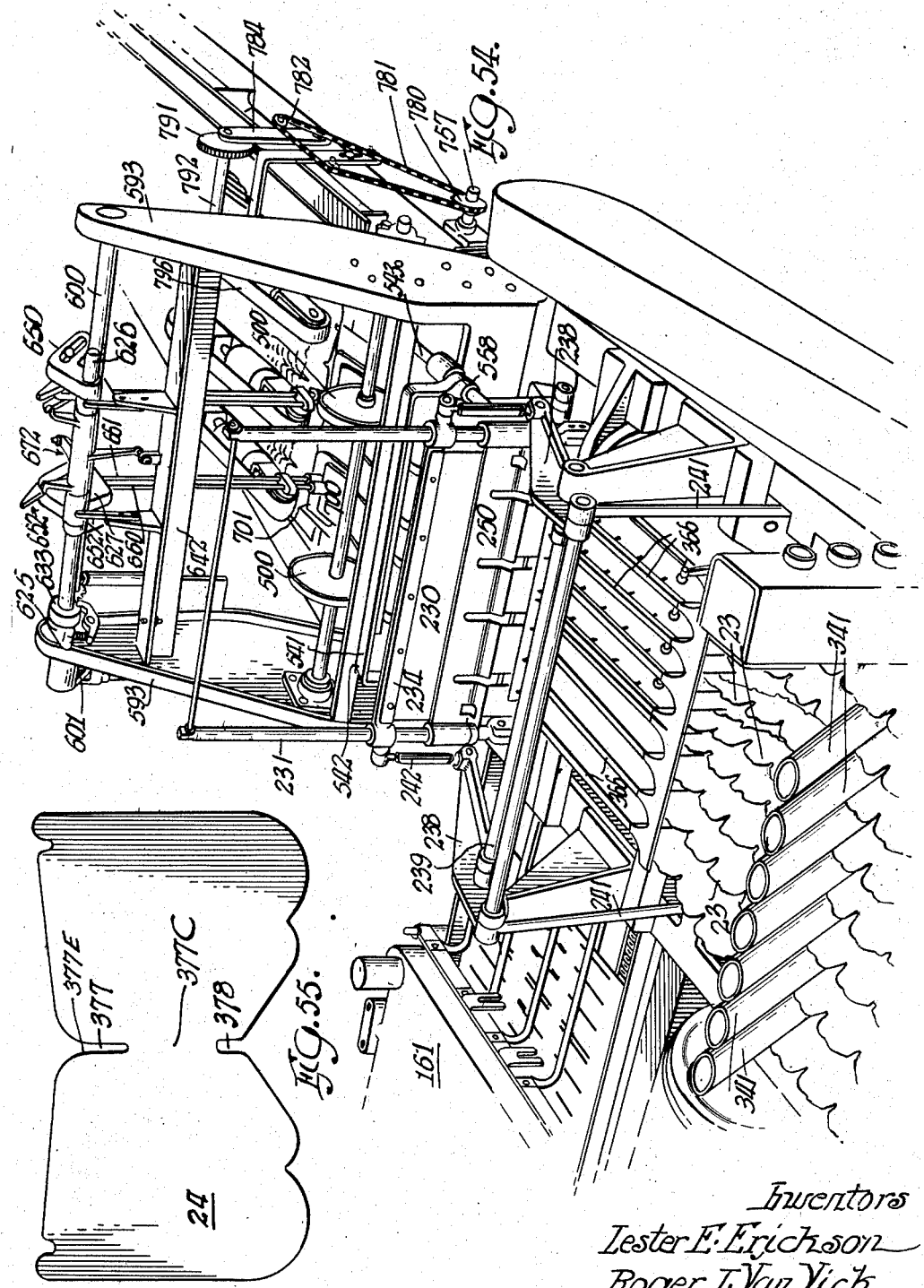

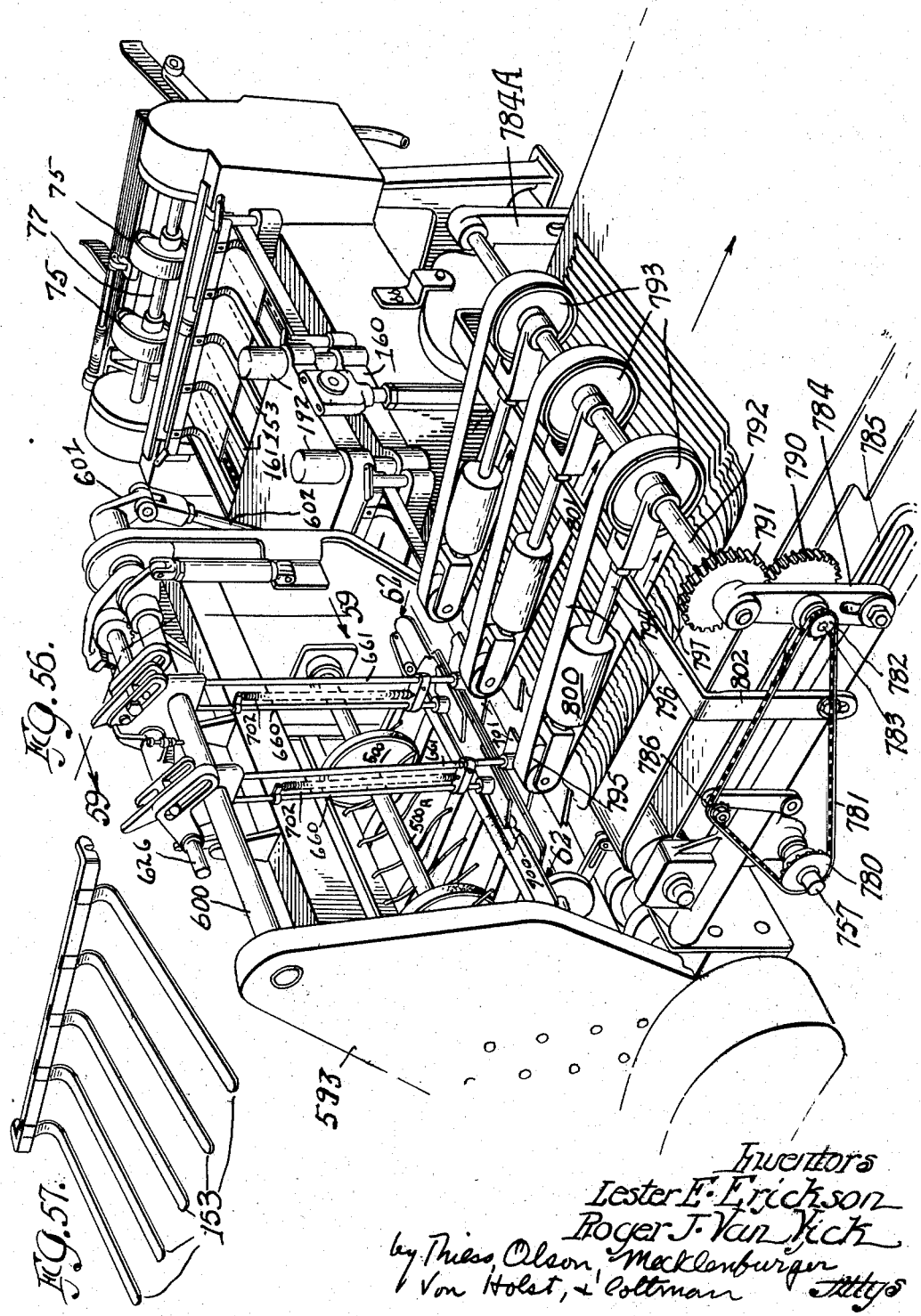

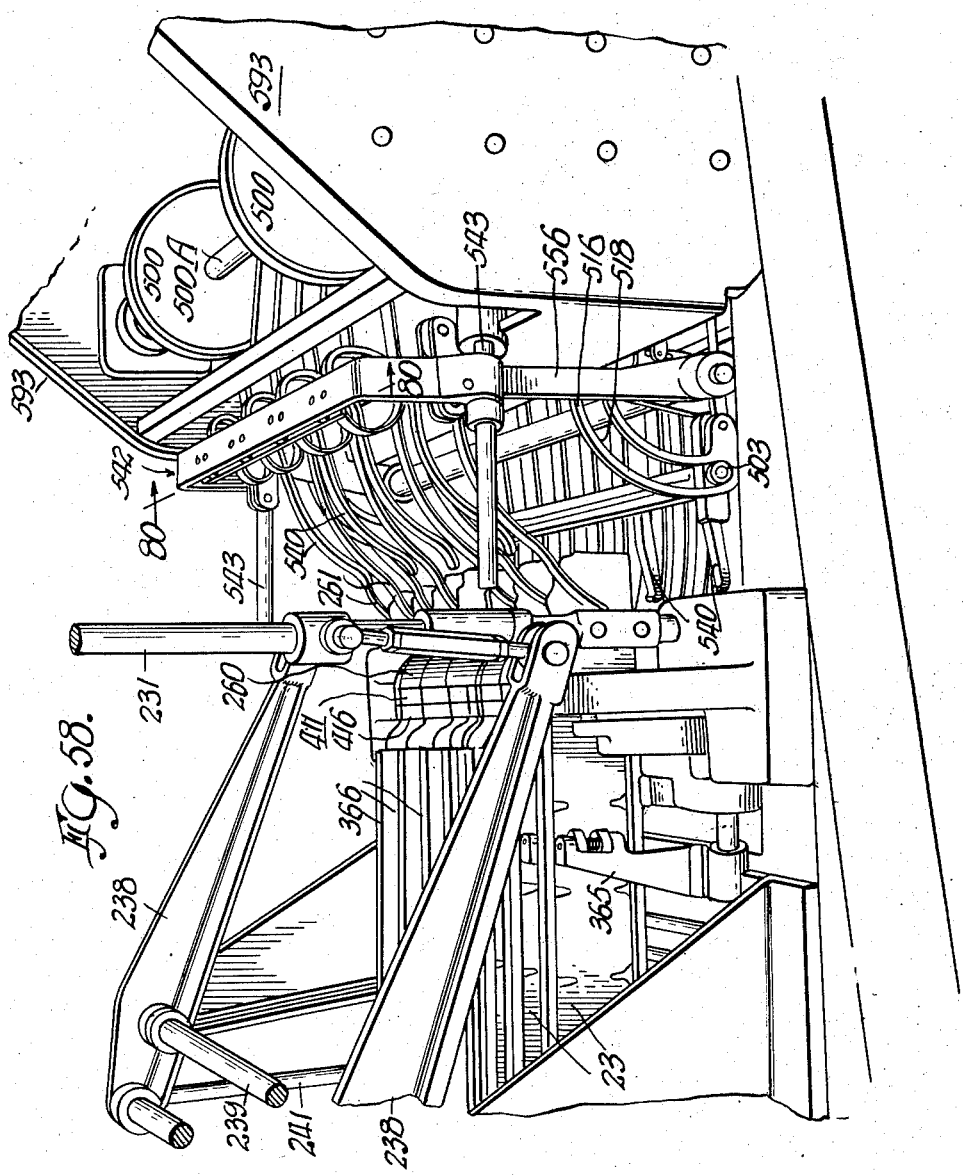

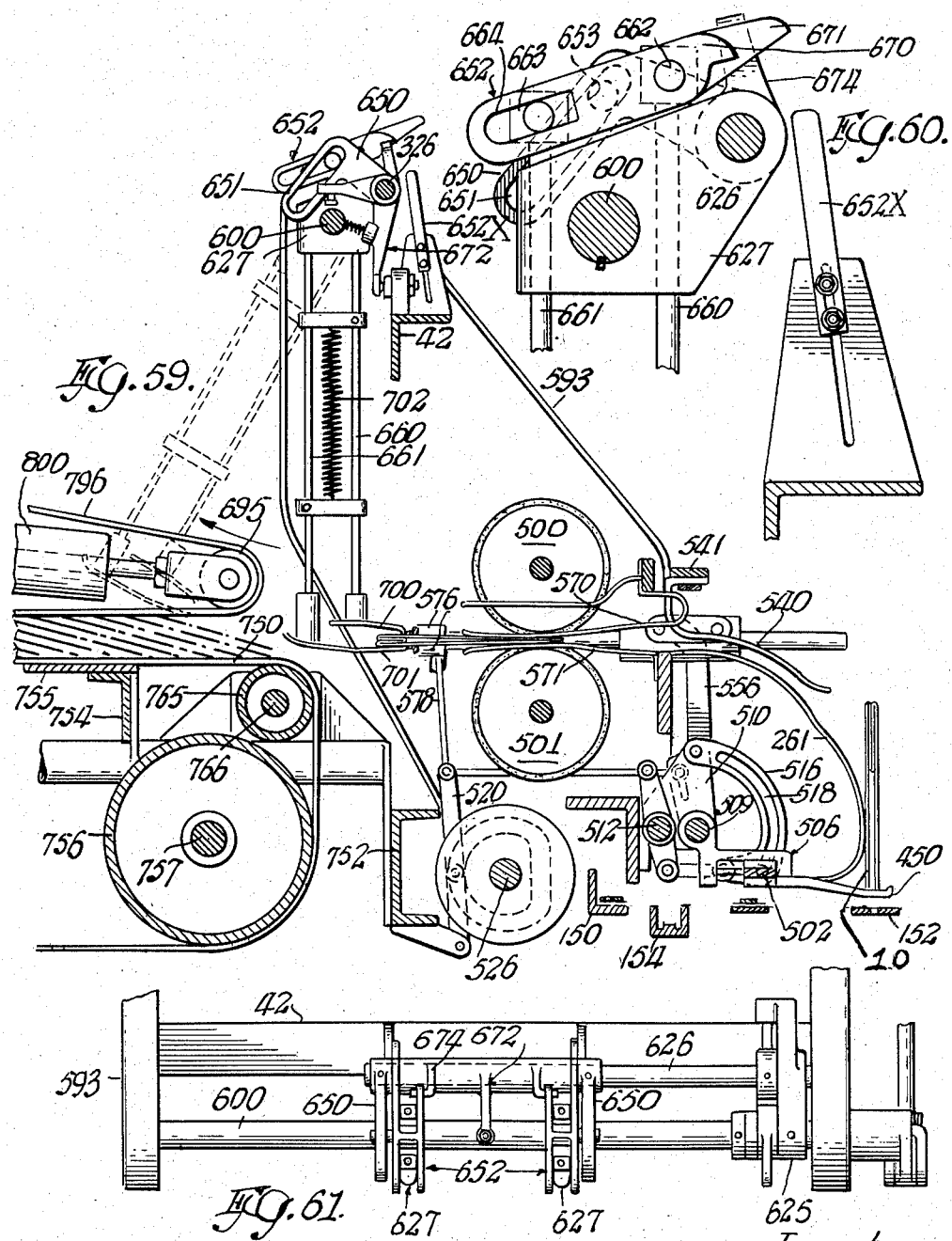

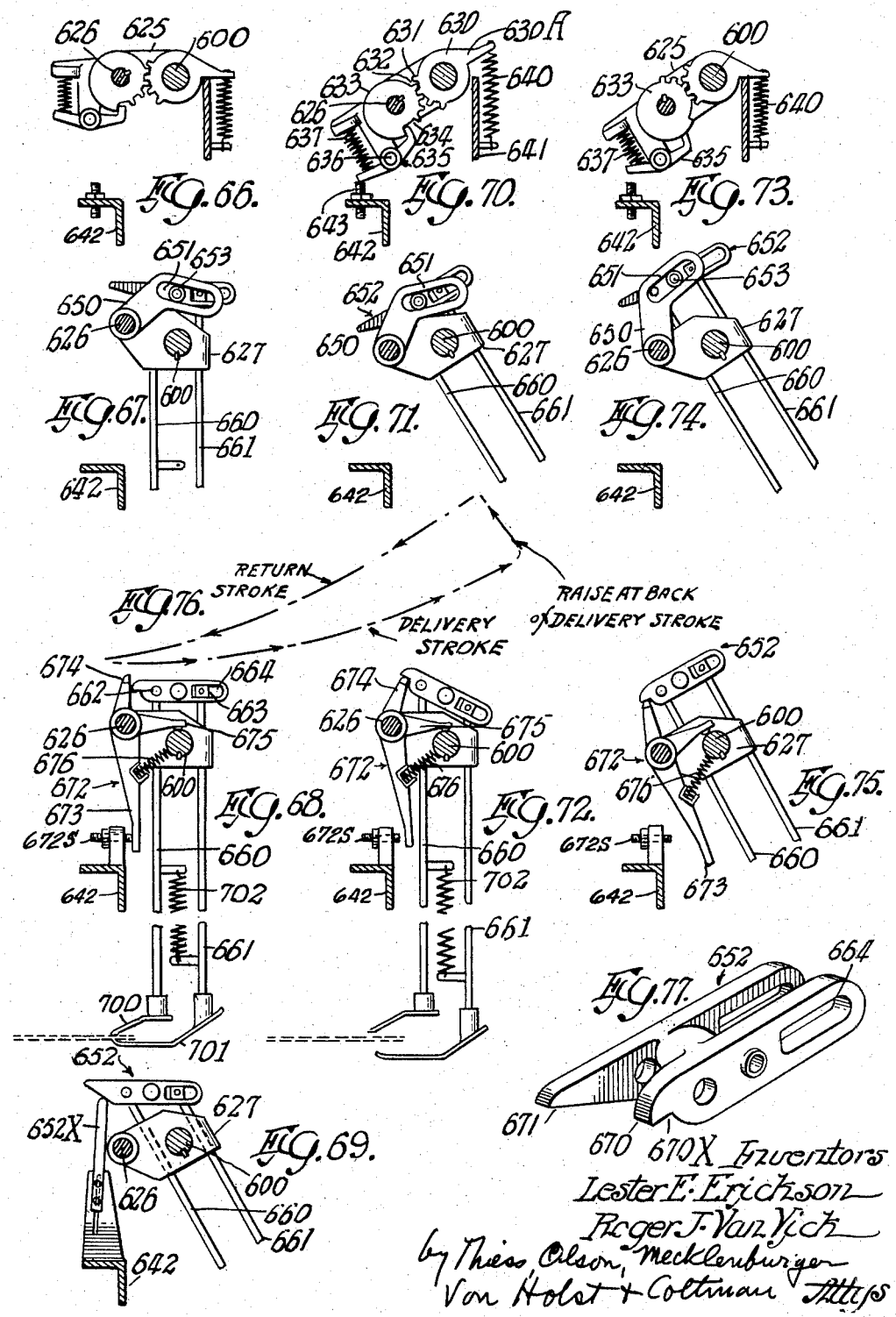

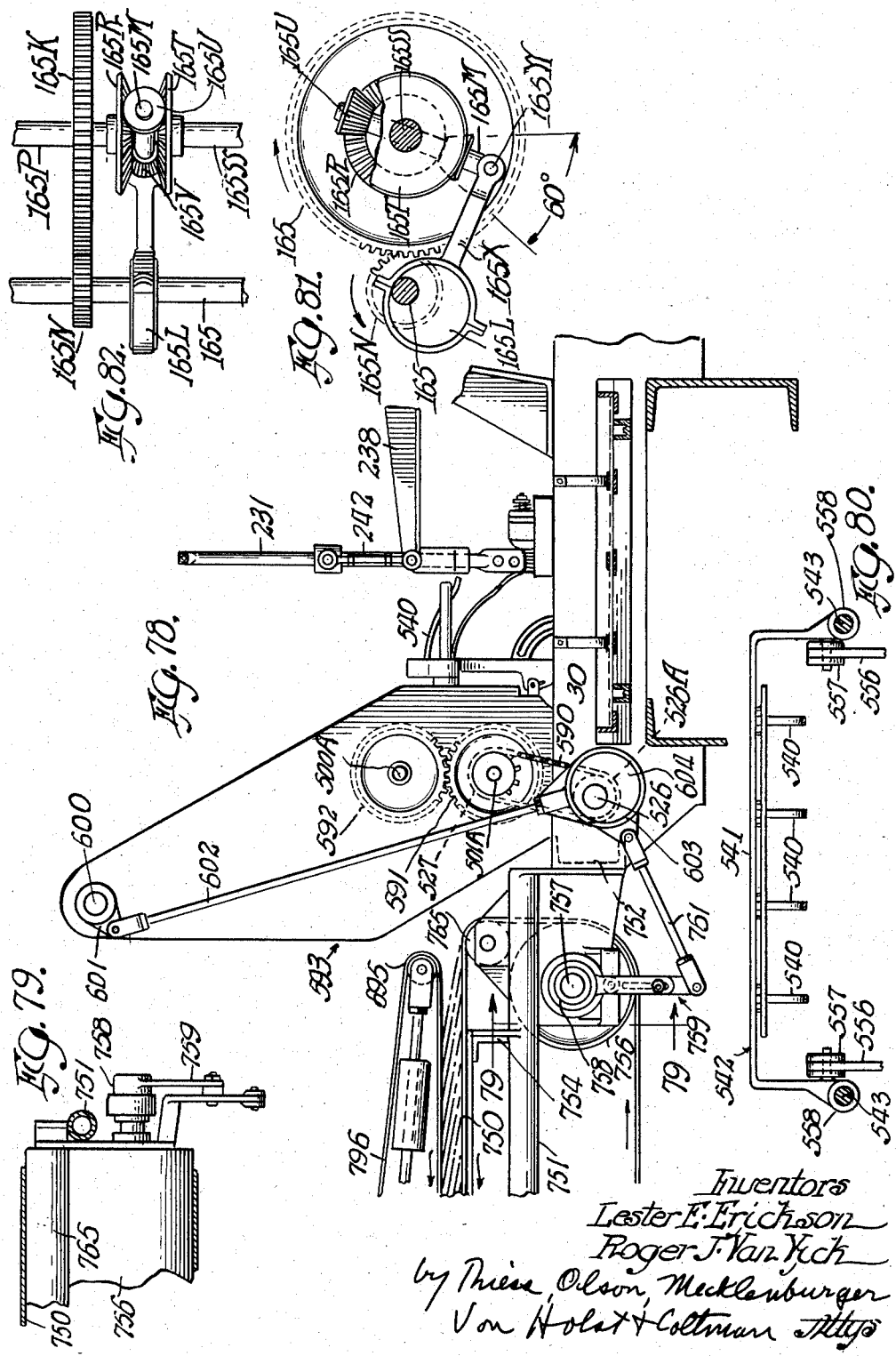

United States Patent Office

2,905,065
Patented Sept. 22, 1959

2,905,065

PROCESS AND MACHINE FOR PRODUCING CARTONS

Roger J. Van Vick and Lester E. Erickson, Duluth, Minn., assignors to Central Fibre Products Company, Quincy, Ill., a corporation of Delaware Application January 24, 1956, Serial No. 561,071

21 Claims. (Cl. 93—37)

The invention relates generally to a process and machine for producing cartons but relates more particularly to a process and machine for producing and assembling egg cartons of the type which, when set up for use, provide two rows of separated compartments or cells arranged upon opposite sides of a medial double walled portion together with a pair of closing flaps which are adapted to be folded over the two rows of compartments to provide a separate cover for each row of compartments or cells.

In cartons of this type the body or wrapper of the carton comprises a single sheet of paperboard which is provided with a series of slots, which when the sheet is folded provides a series of registering slots into which cross wall members are inserted so that each cross wall extends oppositely from the double wall medial portion, serving to form with the medial and side wall of the body or wrapper the two rows of separate compartments or cells.

After cartons of this type have been fabricated and assembled the common practice is to dispose the cross walls so that they lie flat with opposite side portions extending in opposite directions longitudinally of the carton in which condition they are shipped to the user. In setting up such cartons the cross portions are moved into transverse relation and interlocked with the walls of the body or wrapper in such a way as to provide the two rows of compartments or cells, whereupon the carton is ready to receive the eggs and after they have been inserted, the cover flaps can be folded over the exposed tops to complete the enclosure.

In the processes and machine heretofore designed for making and assembling egg cartons of this general type it has generally been the practice to provide a plurality of stacks of preformed individual cross partitions; to remove the individual preformed cross partitions from each of the several stacks or magazines and to advance them toward and to insert them in the several slots of the carton body or wrapper.

One of the objects of the present invention is to provide an improved process of fabricating and assembling cartons of the type mentioned.

Another object of the invention is to provide an improved machine for fabricating and assembling cartons of the type mentioned.

One of the features of the invention is the manner in which the cross partitions are fabricated and assembled with the carton body or wrapper.

In fabricating and assembling cartons of the type mentioned, in which the sheet material of which the body or wrapper and the cross partitions are formed, is paperboard, it is necessary to maintain the stock under precise control at all times and yet to be able to compensate for variations in the stock due to differing atmospheric conditions, to which the stock is subjected.

Another feature of the present invention is to provide means whereby the precise and sometimes conflicting requirements can be met and whereby cartons of the type mentioned can be produced rapidly and at low cost.

Another feature of the invention relates to the manner in which paperboard stock is converted into a plurality of strips or ribbons, each formed to provide portions which are to comprise the cross partitions of the carton and to the manner in which portions of these strips are inserted into receiving slots in the carton body or wrapper and after insertion severed from the remainder of the strip.

The invention further involves the use of novel mechanisms so constructed, arranged and coacting in such manner as to perform the various necessary operations in the required timed sequence, as will make possible the automatic assembly and production of the cartons on a consistent and satisfactory production basis.

Further objects and features of the invention will appear from a description of the invention in conjunction with a preferred practical embodiment illustrated in the accompanying drawings, wherein Figure 1 shows a carton wrapper blank which has been previously scored along the dotted lines to facilitate folding;

Fig. 2 shows the blank of Fig. 1 after it has passed through the dies which form a plurality of slots therein for the reception of the cross wall partitions;

Fig. 3 is a diagrammatic view illustrating the blanks positioned over the lower upfolding blade;

Fig. 4 is a view at right angles to Fig. 3 diagrammatically indicating parts associated with the folding of the blank along the medial line, the folding blade being in its lowest position;

Figs. 5, 6, 7, 7A and 8 are diagrammatic views illustrating the folding of the wrapper along the medial line, the insertion of cross wall partitions in the folded blank and the further reshaping and infolding of the blank to lock the cross wall partitions in place;

Fig. 9 is a view similar to Fig. 8 but on a larger scale, the downfold blade of Fig. 8 having been removed and a portion of one side of the cross wall broken away for lack of space;

Fig. 10 is an end view illustrating a completely assembled and closed carton of the type such as the process and machine are designed to produce;

Fig. 11 is a view in elevation of one end of the machine adapted to withdraw a web of sheet material from a roll, divide the web into a plurality of strips, each containing a plurality of interconnected cross wall partition portions;

Fig. 12 is a detailed vertical sectional view through certain mechanism for decurling the web, the same being located at the extreme right-hand side end of Fig. 11;

Fig. 13 is a fragmentary top plan view of the parts shown in Fig. 12;

Fig. 14 is a vertical sectional view of the die mechanism for dividing the web into a plurality of strips and forming the strips to a shape necessary to provide a plurality of interconnected cross wall partition portions, together with one of the sets of feed rolls for advancing the web;

Fig. 15 is a schematic plan view of the entire machine, excepting the web supply roll, certain of the detail parts being omitted for the sake of clarity of illustration;

Fig. 16 is a face view of the blade member, sometimes termed the upfold blade, for folding the blank along the medial line to provide a once-folded blank, as indicated in Fig. 5;

Fig. 17 is a face view of the blade member, sometimes termed the down fold blade, which causes the infolding of the blank, as indicated in Figs. 7, 8 and 9;

Fig. 18 is a detail vertical sectional view illustrating parts of the mechanism for infolding the wrapper blank, being taken on the line 18—18 of Fig. 30, but on a larger scale;

Fig. 19 is a plan view of the wrapper feed section generally A of Fig. 15 but on a larger scale;

Fig. 20 is a vertical longitudinal section on the line 20—20 of Fig. 19;

Fig. 21 is a fragmentary detail view on line 21—21 of Fig. 20 illustrating mechanism for actuating the finger for picking off wrapper blanks from the stack;

Fig. 21A is a fragmentary detail diagrammatic view illustrating the drive for the wrapper blank feed chains, being driven from the intermittently operating shaft of the differential gearing of the type shown in Figs. 81 and 82 and which is associated with the wrapper blank die section C.

Fig. 22 is a perspective detail view of parts associated with the fingers for holding the wrapper blank down as it moves toward the fold position (E of Fig. 15);

Fig. 23 is a plan view on a larger scale of the wrapper die section C of Fig. 15 for forming slots in the wrapper sheet;

Fig. 24 is a detailed fragmentary view on line 24—24 of Fig. 23;

Fig. 25 is a vertical longitudinal sectional view through the wrapper die and associated parts on the line 25—25 of Fig. 27;

Fig. 26 is a fragmentary detail longitudinal section showing the wrapper registered with reference to the wrapper die substantially on the line 26—26 of Fig. 23;

Fig. 27 is a transverse vertical sectional view on the line 27—27 of Fig. 25;

Fig. 28 is a diagrammatic plan view illustrating the shafting, gearing and driving mechanism associated with parts generally in sections E, F, G, H, I and J of Fig. 15;

Fig. 29 is a plan view of the parts at the folding or assembly position being the parts located generally in the vicinity of sections K, E and J of Fig. 15;

Fig. 29A is a detail fragmentary vertical longitudinal view on the line 29A—29A of Fig. 29;

Fig. 30 is a vertical transverse sectional view on the line 30—30 of Fig. 29;

Fig. 31 is a horizontal fragmentary detail sectional view on the line 31—31 of Fig. 30, showing wrapper blank supporting means at the folding or assembly station or section;

Fig. 32 is a longitudinal fragmentary sectional view on line 32—32 of Fig. 31;

Fig. 33 is a fragmentary detail longitudinal section through one of the wrapper blank feed chains as taken on line 33—33 of Fig. 31;

Fig. 35 is a fragmentary vertical longitudinal view on the line 35—35 of Fig. 30;

Fig. 36 is a fragmentary view in elevation showing certain of the parts for actuating the fingers supporting the folded wrapper in the operation of the downfold blade and for ejecting the wrapper and partition unit from the assembly station;

Fig. 37 is a fragmentary view of some of the parts of Fig. 36 in a different position;

Fig. 38 is an illustrative section of certain of the parts at the lower right-hand part of Fig. 36, diagramming the movement of the ejection fingers;

Fig. 39 is a detail plan view of a fragmentary part of the partition strip cut-off mechanism located on the far side of the machine;

Fig. 40 is a detail sectional view on the line 40—40 of Fig. 39;

Fig. 41 is a perspective view of a rock shaft for actuating the movable blade of the cutoff mechanism, which rock shaft is shown in Fig. 39;

Fig. 42 is a top plan view on the line 42—42 of Fig. 35;

Fig. 43 is a detail fragmentary vertical sectional view of certain mechanisms for actuating the upper fingers of the wrapper and partition unit supporting and ejection means that are located on certain of the cross shafts appearing at the left-hand side of Fig. 35, but being closer to the far side of the machine;

Fig. 44 is a perspective view of the transverse structure for supporting a cross bar to which one end of the lower ejection fingers are fixed;

Fig. 45 is a view in elevation similar to Fig. 11 but showing the far side of the machine and also showing the roll of web stock from which the partition strips are formed;

Fig. 46 is a transverse vertical section on the line 46—46 of Fig. 45;

Fig. 47 is a top plan view of the mechanism shown in Figs. 11 and 45, certain of the parts being broken away for illustrative purposes;

Fig. 48 is a vertical transverse sectional detail view of a fragmentary part of the machine taken on the line 48—48 of Fig. 47;

Fig. 49 is a transverse detail fragmentary sectional view on the line 49—49 of Fig. 29;

Fig. 49A is a fragmentary vertical sectional view on the line 49A—49A of Fig. 49;

Fig. 50 is a transverse detail fragmentary sectional view on the line 50—50 of Fig. 29 showing mechanism for holding the partition strips in the associated guides;

Fig. 51 is a detail enlargement of one of the partition strip guides and associated strip advancing dogs;

Fig. 52 is a detail fragmentary sectional view on the line 52—52 of Fig. 51;

Fig. 53 is a detail fragmentary view of one of the partition strip guides and means for holding the strip in the guide against reverse movement on the back stroke of the feed dogs;

Fig. 54 is a fragmentary perspective of that portion of the machine embodying the partition guide section I, the insertion section J, the folding section E, ejection section K, pick-out section L and a part of the delivery section M appearing in Fig. 15, as viewed from the far side of the machine and from a point somewhat forward of the die set for converting the web stock into partition strips;

Fig. 55 is a full size face view of one of the cross partitions after it has been separated from the strip of which it was a part;

Fig. 56 is a perspective as viewed from the far side of the machine at a point forward of the folding or assembly station or section and looking toward the folding or assembly station and more particularly showing the pick-out mechanism L and a part of the delivery section M, but also showing in the background some of the wrapper feed A, wrapper guide B and wrapper die set C of Fig. 15;

Fig. 57 is a perspective view of one of a number of units for holding down the wrapper blanks at different positions in the machine;

Fig. 58 is a perspective view from the far side of the machine looking toward the assembly and ejection sections of the machine;

Fig. 59 is a fragmentary vertical longitudinal section on the line 59—59 of Fig. 56;

Fig. 60 is an enlarged view of certain parts of the upper portion of Fig. 59;

Fig. 61 is a plan view of the parts shown in Fig. 60;

Fig. 62 is a fragmentary transvere vertical sectional view on the line 62—62 of Fig. 56 showing the mechanism for collapsing the partitions to dispose them into the condition shown in Fig. 65;

Fig. 63 is a view similar to Fig. 62 but showing the collapsing bars in open position;

Fig. 64 is a detail fragmentary vertical section on the line 64—64 of Fig. 63 illustrating the mechanism for actuating the bars which collapse the cross partitions;

Fig. 65 is a face view of a carton unit in the condition in which it appears when taken by the pick-out mechanism L (Fig. 15) and transferred to the delivery mechanism M (Fig. 15);

Figs. 66, 67, 68, 69, 70, 71, 72, 73, 74 and 75 are fragmentary detail views illustrating various positions of the pick-out mechanism and which will be described in detail later;

Fig. 76 is a diagrammatic view showing the path of movement which the gripping jaws, best illustrated in Figs. 59, 68 and 72, take during a complete cycle;

Fig. 77 is a perspective view of a dog member associated with the upper part of the mechanism shown in Figs. 66 to 75, inclusive;

Fig. 78 is a view, partially in elevation and partly in section, as viewed along the line 78—78 of Fig. 15 but on a larger scale;

Fig. 79 is a fragmentary detail view on the line 79—79 of Fig. 78;

Fig. 80 is a detail fragmentary vertical transverse view on the line 80—80 of Fig. 58;

Fig. 81 is a detail fragmentary view of one of two differential mechanisms which are employed in the machine for providing the intermittent movement for the wrapper blank and the partition strips without the necessity of stopping the continuous rotation of the main drive shaft; and Fig. 82 is a plan view of the parts shown in Fig. 81.

GENERAL DESCRIPTION OF PROCESS AND APPARATUS

Figure 27A:
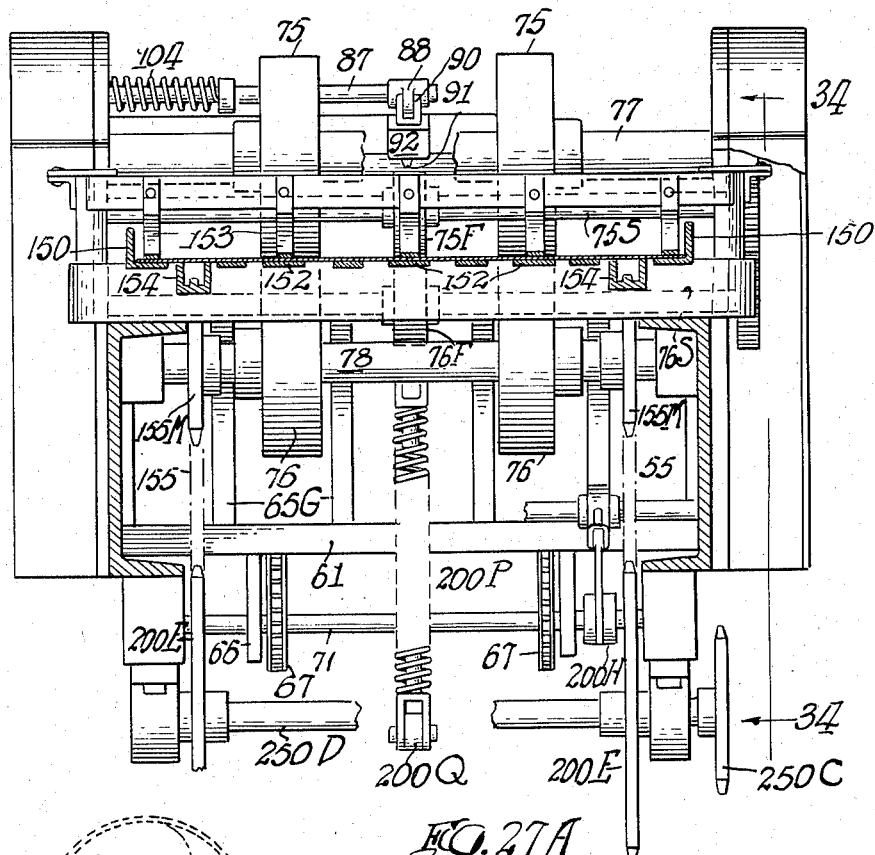
Fig. 27A is a transverse vertical sectional view on the line 27A—27A of Fig. 19.

Referring to the drawings and particularly Figs. 1 to 9, inclusive, it will be understood that the process and machine of the invention is capable of receiving a plurality of flat carton blanks or wrapper sheets which have been previously scored or weakened to facilitate folding. In practice these blanks are usually printed prior to the delivery to the machine. Such a typical blank 10 is illustrated in Fig. 1, the dotted lines therein illustrating where the blank is scored or otherwise weakened to facilitate folding. Thus 11 is the medial line, and the lines 12, 13, 13A, 14 and 15 are parallel lines spaced upon opposite sides of the medial line.

A plurality of the blanks 10 are arranged in a generally upright position in a magazine associated with the wrapper feed section A (Fig. 15). The feed is adapted to remove a carton blank from the magazine and deliver it to the wrapper guide section B, which is adapted to forward it to the wrapper die section C (Fig. 15).

Die section C forms a plurality of slots in blank 10, as shown in Fig. 2. The wrapper blank 10 after being slotted is advanced through wrapper guide section D and then to certain folding mechanism, the center of which is located at section E (Fig. 15) in a vertical plane passing through the medial fold line 11 of the blank. When the blank is positioned at E, it is supported in a horizontal plane by structure 16 schematically illustrated in Fig. 4, being positioned with its medial fold line 11 over a vertically disposed upfolding blade 17.

As a next operation the blade 17 is moved upwardly, causing the blank to be once folded as depicted in Fig. 5. When so folded, the slots in the two wings or plies of the wrapper blank will be in registry, so that there will then be a plurality of sets of registered slots 20 adapted to receive the cross partitions.

One of the many features of the invention relates to the manner in which the cross partitions are formed, advanced and assembled with the folded wrapper blank. At the left-hand end of the machine (as viewed in Fig. 45) there is positioned a roll 21 of sheet material forming a web from which the strips are formed. The roll is mounted for rotation on a horizontal axis, the stock being withdrawn from the roll in the form of a web 22, being advanced in the direction of the arrow (Fig. 45) by the feed mechanism G, and being pulled through the decurl mechanism F (Fig. 15).

The web 22 is advanced intermittently through the partition-forming die section H which divides the web into a plurality of strips 23, each strip being formed to provide a plurality of interconnected cross partitions of the shape shown in Fig. 6. In the mechanism illustrated, the web is disposed in a horizontal plane. As the strips advance toward the folding or assembly position at E (Fig. 15), they first pass through a partition guide section I which twists the strips 23 so as to dispose the forward or advancing end portions thereof in a substantially vertical plane. The vertically disposed strips then enter a plurality of guides 25 which are located in the insert section J, the said guides being aligned with the slots 20 upon opposite sides of the medial line 11, which slots are in registry after the blank is folded, as shown in Fig. 5. There is thus provided a plurality of sets of slots with which the guides 25 are aligned.

The web 22, the strips 23 into which portions of the web are progressively divided, and the cross wall portions 24 of the strips advance together, the leading portion of each strip 23 being inserted into a set of registering slots in the folded blank 10 until such partition portion is located with equal parts projecting away from the folded blank, as illustrated in Fig. 6.

Thereafter the leading partition portion of each strip is severed from the remainder of the strip by shear mechanism indicated by dot-and-dash lines 30 (Fig. 6).

Parts of the folded portions of the blank 10 above the partitions are then unfolded, as indicated in Figs. 7, 8, and 9, as will be described in detail later.

The folded wrapper blank and inserted partitions are then ready for removal as a unit, which takes place in the ejection section K (Fig. 15). In this section the assembled unit is turned from a vertical position to a generally horizontal position and into a partition collapsing mechanism from which they are picked out at section L. Section L mechanism delivers the units to the delivery section M, which places them in position for removal by an operator.

Having given a general description of the process and apparatus, the various special features of operation and construction will be most easily understood by describing the parts under separate appropriate headings.

*The motor, main power shaft, associated drive shafts, etc.*

The location of these parts is best shown in the diagrammatic view (Fig. 28) wherein 30—30 represents longitudinal side frame members of the machine or apparatus which are connected by suitable cross braces, not shown.

An electric motor 31 is located on one side of the machine. Since the operator usually stands on that side of the machine, it will for convenience be termed the near side, and the opposite side the far side.

Associated with the motor 31 is certain reduction gearing 32 from which extends a stud shaft 33 to which is fixed a sprocket pinion 33P connected by chain 33C to a sprocket 34S fixed to cross shaft 34, the latter being suitably mounted for rotation in the machine frame and which constitutes the main power shaft.

Shaft 35 is driven from shaft 34 by means of chain 36 and sprockets 37 and 38 fixed to shafts 34 and 35, respectively. Shaft 39 is driven by chain 40 operating around sprockets 41 and 42 fixed in shafts 34 and 39, respectively. Shaft 43 is driven from shaft 39 by means of the pinion gear 44 fixed to shaft 39 and the gear 45 fixed to shaft 43.

Shaft 46 is driven by chain 47 by means of sprockets 48 and 49 fixed to shafts 39 and 46, respectively.

At the right-hand end of the machine, as viewed in Fig. 28, is a chain 50 which leads to a sprocket on the main shaft of the wrapper feed section A, Fig. 15, later described in detail. Chain 50 is driven by a sprocket 51 fixed to a shaft 52, the latter being driven by bevel gears 56 and 54 fixed to shafts 52 and 39, respectively.

The various cams, eccentrics, differential gear sets, etc., associated with the shafting mentioned above will be identified in connection with the various sections as they are described.

The wrapper feed section (A, Fig. 15)

This mechanism is best shown in Figs. 19, 20, 21, and 21A.

The wrapper feed comprises a frame including cross members 60 and 61 and upright side portions 62—62, the latter having parts 63—63 projecting away from the portions 62—62 and slightly inclined upwardly to the horizontal away from the member 60.

The parts 63—63 support members 64—64 which act as side guides for the stack 65 of wrapper blanks 10. It will be understood that the lower edges of the wrapper blanks rest upon supporting arms 66—66 and are advanced step by step, by means later described, by chains 67—67, the latter extending between and around sprockets 68 and 69 and shafts 70 and 71, respectively. The wrapper blanks extend generally upwardly but incline slightly forwardly so that the top edges are closer to the near side of the machine than are the lower edges. 75—75 and 76—76 are wrapper blank pick-up rolls mounted upon upper and lower cross shafts 77 and 78, respectively, which rotate in the direction of the arrows (Fig. 20). As shown, one of these rolls each has a gap in it disposed between the inturned portions 80 and the rim portion 82.

Located between the pick-up rolls 75—75, 76—76 is a hollow suction arm 85 carried on a tubular cross rock shaft 86. Tubular shaft 86 is mounted for rocking movement, by means later described, thereby causing suction arm 85 to swing toward and away from the exposed face of the adjacent wrapper blank of the stack of wrappers 65.

At one end of tubular rock shaft 86 is a valve 86V having a valve plug in the casing thereof, and which when in one position has its port 86K aligned with port 86P of the casing, thus communicating with the pipe 86W. Pipe 86W leads to a vacuum pump, not shown. When port 86P is aligned with port 86K in the plug, a vacuum is created in the tubular cross shaft 86 and the arm 85 connected thereto. Arm 85 has a suction head 85H which faces the exposed blank in stack 65 and engages therewith when said aforementioned ports are aligned. As arm 85 swings away from the stack 65, it carries with it the upper portion of the exposed wrapper blank so as to flex it around the curved guides 65G which are supported by frame member 61. The member 85 in Fig. 20 is shown in a mid-position of its swing.

It should be understood that before the suction head 85H contacts the wrapper blank, means, shortly to be described, separates the upper part of the exposed wrapper blank from the remainder of the blanks in the stack, thus facilitating removal by the vacuum means.

A cross shaft 87 is located above the stack of wrapper blanks being mounted in the frame of the machine for rocking movement. Fixed centrally of the shaft is an arm 88 to the outer end of which is pivotally secured at 89 a depending finger 90 having a tip 91 adapted to enter between the wrapper, the exposed face of which confronts the wrapper pick-off mechanism, and the next wrapper blank in the stack 65 and cause a slight separation of the two adjacent blanks at the top.

The finger 90 passes through a fixed member 92 and is guided thereby in its reciprocating movements.

The means for rocking the rock shaft 87 is shown best in Fig. 21, wherein 94 is a cam fixed to rotate with shaft 95. An arm 96 is pivoted at 97 to swing from that point on a fixed axis. At the outer end of the arm is a roller 98 which rides on the peripheral face of cam 94, the latter including a dip portion 99 in its periphery. A rod 100 is connected at its lower end to the arm 96 at 101 and at its upper end at 102 to the outer end of an arm 103, the latter being fixed to the cross rock shaft 87.

A torsion spring 104 (Fig. 19) surrounds shaft 87 having one end 105 fixed to the shaft 87 and the other end 106 fixed to a part of the machine frame. The spring 104 causes the roller 98 to press against the peripheral face of cam 94 so that a reciprocatory movement is imparted to rod 100 and through the parts described to the pick-off finger 90.

As the upper portion of the wrapper blank 10 is flexed downwardly, as before described, the upper portion is brought substantially into a horizontal plane which is common to the plane of the meeting peripheral portion of the rollers 75, 76. At this time the gaps in the two rollers are in a position to admit that portion of the blank. Further rotation of the rollers 75, 76 then brings the uninterrupted peripheral portions of the rollers 75, 76 into contact with opposite faces of the blank 10 and advances it to the feed rolls 75F, 76F fixed for rotation with transverse shafts 75S, 76S.

Figure 34:
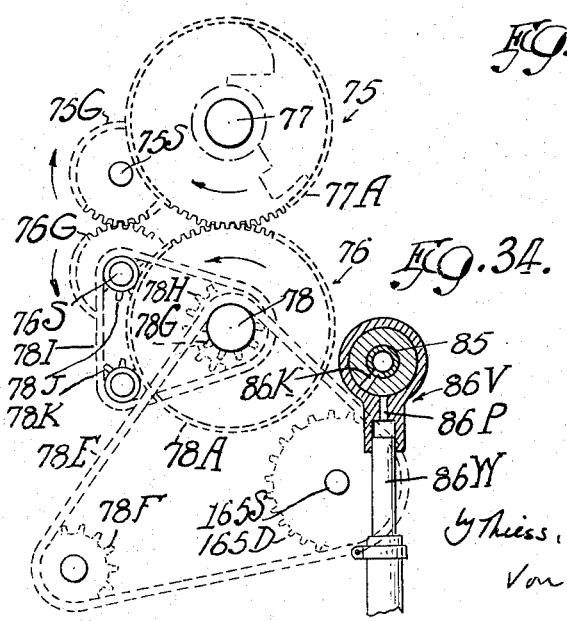
Fig. 34 is a fragmentary view on the line 34—34 of Fig. 27A showing the drive for the feed rolls for advancing the wrapper blanks.

Shafts 75S, 76S are mounted in suitable bearings in the frame of the machine and at one end have fixed thereto intermeshing gears 75G, 76G (see Fig. 34).

The shafts 77, 78 on which the large feed rolls 75, 76 are fixed, are also driven by interconnecting gears 77A and 78A.

The drive for these parts is obtained from shaft 165S (Fig. 34) which is driven from the main drive shaft 165 of the wrapper feed, punch and die sections A and C of Fig. 15 by means of chain 165C (Fig. 25) which is operatively connected with sprockets 165B—165D fixed to shafts 165 and 165S, respectively best shown in Figs. 27 and 34. Shaft 78 (Fig. 34) is driven by chain 78E which is trained around an idler sprocket 78F and sprocket 78G on shaft 78 (see Fig. 34). Shaft 78 has a sprocket 78H fixed thereto. A chain 78I is trained around sprocket 78H and sprocket 78J on shaft 76S and around idler sprocket 78K.

The means for swinging the vacuum arm 85 is best shown in Fig. 20. On shaft 165S is an eccentric 200E, arm 200F of which is connected to link 200G which actuates a one-way clutch 200H on shaft 71. Shaft 165S rotates continuously and, through the mechanism just described, imparts a step-by-step rotation to shaft 71.

On shaft 165S is also fixed a cam 200I with which is associated a follower 200J carried by a crank 200K. One arm 200L of the crank is pivoted at 200M on a pin 200N fixed to the frame. Another arm of the crank is pivotally connected to an arm 86X fixed to the tubular shaft 86. Rotation of cam 200I through the mechanism just described causes swinging movement of arm 85 toward the exposed wrapper blank, to engage the head 85H thereof with that sheet as before explained. Spring 200P connected at one end to an arm 200Q fixed to the frame and at the other end to arm 200R carried by the vacuum arm 85, causes movement of vacuum arm 85 away from the stack of blanks 65 and delivery of the picked-off blank to the rolls 75, 76.

The peripheral speed of feed rolls 75F and 76F is the same as the peripheral speed of the large feed rolls 75, 76, so that when the blank is engaged by the feed rolls 75F and 76F, the blank is quickly advanced to the wrapper guide section B of Fig. 15.

It will be understood shaft 165 is driven by chain 50 (see Figs. 25 and 28), operatively connected to sprocket 51 shifted on shaft 52, and sprocket 165CX (Fig. 27).

Wrapper slotting die set and associated parts (B and C of Fig. 15)

As explained in connection with the wrapper feed, as the wrapper blanks 10 are successively removed from the stack of blanks 65 at the wrapper feed section, they are delivered to the wrapper guide section B and thence to the die set C.

The construction and operation of these parts will be best understood by reference to Figs. 23, 24, 25, 26, and 27.

The wrapper guide section B (see Fig. 24) comprises side angle rails 150—150 suitably supported above the subjacent frame members 151—151. Intermediate the members 150—150 are a plurality of spaced flat members 152. The wrapper blank 10 is supported upon the upper faces of members 152 and the upper face parts of the horizontally disposed portions of the rails 150. The blank 10 is held down by the hold-down fingers 153 which are a part of a removable unit, like that shown in Fig. 57.

Adjacent and parallel to the rails 150 are a pair of open top chain guides 154 in which the upper laps of the wrapper feed chain 155 travel. At spaced intervals the feed chains 155 are provided with feed dog lugs 156 which, in the upper lap position of the chain, extend above the plane of the edge of the wrapper blank 10 and serve to move the blank in the direction of movement of the upper laps of the chains, i.e., when in guide section B toward the die set C and from there through the guide section D toward the wrapper folding section E (Fig. 15).

Wrapper feed chain 155 is driven from the intermittently driven shaft 165SS of the differential drive mechanism shown in Figs. 81 and 82.

Shaft 165SS (see Fig. 21A) has fixed thereto a sprocket 250A at a point outside of one of the side frame members 151 and, through chain 250B, drives a sprocket 250C on a cross shaft 250D. On shaft 250D are two sprockets 250E which engage the lower laps of and drive the wrapper feed chains 155.

The stroke of the forward and reverse movement of the drive chain 155 is slightly greater than the dimension of the wrapper blank 10 in the direction of its movement. The purpose of this is to position the chain lugs 156 slightly rearwardly of the trailing edge of the blank 10 when the chain is ready to gain advance and move the blank 10 forwardly.

Wrapper chains 155 are endless, the upper laps pressing over sprockets 155N and 155M (see Figs. 20 and 30) and the lower laps passing around sprockets 155P and 250E (see Fig. 21A).

*Intermittent drive mechanism for wrapper feed chains*

The mechanism for intermittently driving or advancing the chains 155 is best shown in Figs. 81 and 82. The main drive shaft 165, which is constantly driving, carries two components fixed to it, one being an eccentric 165L to impart a rocking motion to a drive pinion rocker shaft 165M. The other component is a primary drive pinion 165N which meshes with a second primary drive gear 165K which is permanently fastened to a shaft 165P which also carries and has fixed to it a driving bevel gear 165R. A third shaft 165SS runs in the same plane but is not connected to the driving bevel gear shaft 165P. Shaft 165SS has fixed to it a driven bevel gear 165T. Drive pinions 165U and 165V are mounted on shaft 165M but are free to revolve thereon. These pinions mesh with both bevel gears 165R and 165T. Shaft 165M has a stud pin 165W fixed to one end thereof. Eccentric strap arm portion 165X is connected to pin 165W.

During operation, the shaft 165 drives the bevel gear through the primary drive gears at a constant rate of speed. The driven bevel gear 165T is, in turn, driven by the action of the drive pinions 165U and 165V. If the eccentric were disconnected from the rocker shaft connecting pin, the drive pinion rocker shaft 165M would rotate and the drive pinions would impart no rotary motion to the driven bevel gear 165T. If the rocker shaft connecting pin were held stationary, the driven bevel gear would be driven by the drive pinions in the opposite direction, but at the same constant speed as the driving bevel gear 165R. A combination of these actions serves to impart an intermittent action to the driven bevel gear 165T and the shaft 165SS on which it is fixed. While the eccentric is rotating the rocker shaft in the same direction as the driving bevel gear, the driven bevel gear remains stationary. When the eccentric is rotating the rocker shaft in the direction opposite to that of the driving bevel gear, the driven bevel gear is rotated in the opposite direction and at a proportionately greater speed to regain that fraction of a revolution lost at the time the driven bevel gear was stationary. It is inherent in this drive that the driving bevel gear and the driven bevel gear always rotate exactly the same amount in total but in opposite directions.

The die set for providing the various slots in blank 10 as they appear in Fig. 2 comprises a lower fixed female die member 160 and a movable upper male die member 161 (see Fig. 25).

With the upper die in raised position, as shown in Fig. 25, the wrapper is moved by the chains 155 into approximate position between the die members and under a set of hold-down fingers 153 of a unit like that shown in Fig. 57. For causing accurate registry of the wrapper blank in the die set, and for reciprocating the die member 161, the following mechanism is provided.

A cross shaft 165 is journalled for rotation in bearings 166X which are fixed to and depend from the main frame side members 151—151. Fixed to rotate with shaft 165 is a cam 166 having a cam groove 167 in one face thereof.

Cross shafts 168 and 169 are mounted in the frame of the machine for rocking movement. Fixed to rock with shaft 168 is an arm 170, one end of which carries a roller or follower 171 which operates in the cam groove 167 and serves to impart rocking movement to the rock shaft 168. On shaft 168 adjacent the side frames (see Fig. 27) are fixed arms 172—172 to the other ends of which are pivotally secured the lower ends of vertically disposed rods 173—173. The upper ends of rods 173—173 terminate in portions 174—174 which reciprocate in vertical holes in the lower die member 160. When in lower position, the top of the portions 174—174 (see Fig. 25) are below the plane of the underside of the wrapper blank 10, but when in upper position extend above the top face of the blank and form a stop for the advancing edge of the wrapper blank (see Fig. 26).

Fixed to rock shaft 169 is an arm 175, one end of which carries a roller or follower 176 which operates in the cam groove 167 of cam 166 and serves to impart rocking motion to shaft 169.

Extending between the side frames 151—151 at a higher level is another rock shaft 180 to which there is fixed a depending arm 181. Also fixed to shaft 169 is a depending arm 182. Extending between and pivotally connected at its ends to arms 181 and 182 is a link 183 whereby rocking motion is imparted to shaft 180. Shaft 180 also contains two upstanding arms 185 spaced along the shaft 180, one thereof being shown in Fig. 25. To the upper end of each arm 185 there is pivotally attached a member 186, to the outer end of which is attached a finger 187, the underside of the tip of which rests upon the inclined cam surface 188 on the cross frame member 160F adjacent one side of the lower die member 160 and including a part of the die member (see Figs. 25, 26), being normally below the plane of the under face of the wrapper blank 10.

The timing of the parts is such that the portions 174—174 of rods 173—173 are in the upper position before the wrapper blank reaches its position between the upper and lower die members. Then shaft 185 is rocked, causing the fingers 187 to slide up cam surface 188 and into contact with the trailing edge of the wrapper blank 10 and serving to push the wrapper blank into position against the stop portions 174 (see Fig. 26), thereby causing perfect registry of the wrapper blank, with those parts of the upper and lower die members which are to die cut the various slots in the blank which are shown in Figs. 2 and 23.

Fixed in and upstanding from the lower die member 60 are four posts 190. Fixed to and upstanding from the upper face of the upper die member 61 are four cap members 192. The posts extend slidably through vertical openings in the upper die members and, when the upper die member is depressed, extend into the cap members 192.

The upper die member is reciprocated in proper timed relation to the associated parts of the machine by means of the eccentric crank arms 193—193 of shaft 165 and the connecting rods 194—194, the lower ends of which are operatively connected to the cranks 193—193 and the upper ends to stud bearings 195—195, which project from opposite ends of the upper die member.

After the wrapper blank has been die cut to provide the various slots therein, the upper laps of the conveyor chains 155 advance the wrapper blank through guide section D, passing under a hold-down unit like that shown in Fig. 57 and into position in the folding section E (Fig. 15).

Each wrapper blank is brought into proper registry in the folding section by mechanism similar to that which causes proper registry of the blank in the die section just described. Thus fixed to shaft 180 is a depending arm 200 to which one end of a rod 201 is connected, the opposite end of rod 201 being connected to an arm 202 which is fixed to and depends from a cross rock shaft 203 located adjacent the side frame member 30, on the near side of the machine, and journalled for rocking movement in frame members 151 (see Figs. 25 and 30). Since the parts on shaft 203 for registering the blank in position to be folded are similar to those associated with shaft 180 (Fig. 25) they have been given the same numbers with the letter F added. It is believed the registering operation in the folding section will be understood without further comment. However, the stops 174F (see Figs. 31, 32) are in this instance adjustably fixed to an immovable part of the machine frame since the wrapper does not advance beyond that point in the direction in which the upper laps of the feed chains in section B, C, D and E (Fig. 15) move.

*Wrapper blank folding mechanism*

The location of the wrapper blank 10 in position to be folded is shown by means of dotted lines in Figs. 31 and 32. The mechanism for once folding the blank, i.e., from the flat condition shown in Fig. 2 to the folded condition shown in Fig. 5, is best shown in Figs. 3, 4, 5, 28, 29A, 31 and 32.

Referring more particularly to Fig. 29A, there is fixed to shaft 35 an inside cam 210. It will be understood the upfold blade is mounted for vertical reciprocation. The bottom marginal portion 17M (see Figs. 3 and 30) is secured to an angle bar 17N having end sleeve portions 17R which slide on posts 17P supported from the frame of the machine. The upper marginal portion 17U of the blade 17 is positioned in and for travel through an elongated slot 212 in the central wrapper blank supporting member 152 (see Figs. 29A and 31).

For more firmly guiding the upfold blade 17, there are provided with two stationary angularly disposed bars 17RX supporting a plurality of inserts 17S which engage portions of opposite faces, as best appears in Fig. 29A.

Pivotally mounted on a bearig pin on the main frame of the machine at 213 is an arm 214 having a roller or follower 215 which travels in the cam groove 216 of cam 210 and whereby swinging movement is imparted to arm 214 to move it between the full and dotted line positions shown in Fig. 29A. Rocking movement is thus imparted to lever 217, which is pivoted at 218 to part 219 fixed to the adjacent frame member 151, by means of the connecting link 221. The other end of the lever is connected to member 222, fixed to the member 17N on the bottom margin of the upfold blade 17, by means of the connecting link 223. Link 223 is adjustable in length so that the length of the movement of the blade can be varied as required.

The downfold blade 230 is also mounted for vertical reciprocation. To this end there are provided two posts 231, one adjacent each side of the frame (see Fig. 30) and being fixed to the machine frame through the medium of parts 232 and 233. Extending across the upper margin of the upfold blade 230 is a slotted member 234 in which the blade is positioned, being fixed by suitable fasteners 235. Opposite ends of member 234 have fixed thereto sleeve portions 236 which are bored to receive the posts 231 and through which said posts extend. The posts 231 are cross connected at the top by member 237 to maintain the structure in stable position.

To actuate the downfold blade there is provided a pair of levers 238 pivoted on cross shaft 239. On shaft 35 are two eccentrics 240. Links 241 connect eccentrics 240 with levers 238 so that rotation of shaft 35 causes rocking movement of levers 238 between the full and dotted line positions shown in Fig. 29A.

An adjustable link 242 connects the end of the long arm of lever 238 to a stud 243 which is an integral part of portion 236 of the cross member 234. Rocking movement of lever 238 will thus cause vertical reciprocation of the downfold blade 230. The functioning of the downfold blade and the wrapper blank spreading member 250 associated therewith will be described later since it functions after the cross partitions have been inserted into the slots in the once folded blank.

As the upfold blade moves upwardly from the positions shown in full lines in Figs. 4 and 29A, the blank is pushed between a curved breast plate 260 and a plurality of fingers 261, which will be described in detail later, but which serve to confine and hold the folded blank in position so that the cross partitions can be properly inserted in the plurality of sets of aligned slots in the folded blank.

Before explaining the action of inserting the cross partitions and of removing the assembled blank and cross partitions as a unit from the assembly position, a description will be given of that part of the machine from which the strips comprising the plurality of partition portions 24 are formed.

*Web stock holding, decurling and forwarding mechanism*

At the right of the decurl section F, as viewed in Figs. 15 and 11 and to the left as viewed in Fig. 45, there shown is a roll 275 of sheet material in the form of a wide web 22 which is to be divided into a plurality of strips 23, each of which will be shaped by die mechanism to provide a plurality of cross wall portions 24, one of which is shown in Fig. 55 detached from the remainder of one of the strips. The roll 275 is mounted for rotation in a suitable stand 277 (Fig. 45) which finds its support on the floor, being broken away for lack of space.

The web stock is withdrawn from roll 21 and pulled through the decurl mechanism by means of a pair of feed rolls 278, 279 which are provided with friction bands 280X and 281, respectively, the rolls being driven from shaft 46 by chain 290X (see Figs. 45, 46) and the sprockets 291 and 292 and the intermeshing gears 293, 294, the latter being fixed to the shafts of the rolls 278 and 279, respectively. Shaft 46 is driven from shaft 39 by means of chain 47 trained around sprockets 48, 49 fixed to shafts 39 and 46, respectively.

The web stock passes underneath a blade 280 which is positioned between two rolls 281', 282 mounted for rotation on shafts 283, 284, respectively. The blade 280 is carried on a lever structure 285 which is mounted for rotation on shaft 283. By means of a worm sector 285W fixed to shaft 283, a worm 286 fixed to shaft 287 and hand wheel 288 (see Fig. 11), swinging movement can be imparted to structure 285 to raise and lower blade 280 whereby to provide for the amount of decurl action necessary to straighten the web so that it will remain flat.

Desired pressure can be applied to the web as it passes through rolls 278, 279 by the screws 290A and hand wheels 291A. A chain 292A passes around and into operative connection with sprockets 293S fixed to the screws 290A, so that turning of either hand wheel will actuate both screws.

In advance of the feed rolls 278, 279 is a similar pair of feed rolls, for which reason similar parts have been given similar numbers but with the addition of the letter A. However, the drive for the rolls is different and will be described. Feed rolls 278, 279 are driven continuously when the machine is in operation whereas rolls 278A, 279A are operated intermittently in timed relation with the operation of the partition die at section H since the web must be at rest when the upper and lower die elements at H are interengaged to sever the web into strips and to provide the proper contour outline to the strips. Hence the rolls 278A, 279A operate to advance the web in a step by step manner in increments equal in length to the length of a cross wall partition 24.

The intermittent drive for rolls 278A, 279A is obtained by means of a differential drive mechanism like that shown in Figs. 81 and 82. For this reason the differential mechanism which drives said rolls intermittently is shown only diagrammatically in Fig. 28. Therein 43A of said gearing is the intermittently driven shaft on which is fixed a sprocket 43B located outside frame 30 on the far side of the machine. Chain 43C operates sprocket 43D fixed to shaft 43E of the lower feed roll 279A. Also on said shaft 43E is a drum 43F. Spring pressed brake arms 43G press against the periphery of the drum to prevent overrunning of the rolls.

43H is a device to tension the drive chain 43C.

On shaft 39 (Fig. 28) and on shaft 165 (Fig. 27) are fly wheels 43J and 43K respectively to facilitate uniformity of operation.

Partition-forming die set, section H, Fig. 15

This die set is perhaps best shown in Figs. 11, 14, 45 and 47. It comprises an upper die member 320 and a lower die member 321. The upper die member 320 is mounted for vertical reciprocation upon a plurality of posts 322. Vertical reciprocation is imparted to the upper die member 320 by means of the eccentrics 323 and the adjustable connecting rods 324 on both sides of the machine frame 30.

These die members are so formed that on each downward movement of die member 320 the width of sheet material 22 is divided into a plurality of strips 23. Each strip, in turn, comprises a plurality of interconnected cross wall partition portions 24, as hereinbefore described, and which are later to be assembled with the folded wrapper blank 10 at the folding section E of Fig. 15.

It will be understood that the web 22 and the plurality of strips 23 divided therefrom are in a horizontal plane as they pass through the die mechanism just decribed and as they emerge therefrom. However, since the plurality of sets of aligned slots in folded wrapper blank at folding section E, Fig. 15, are disposed in vertical planes, it is necessary to position the strips in vertical planes in order to insert them into the slots in the wrapper blank. This action occurs in partition guide section I, Fig. 15, which will now be described.

Partition guide, section I

Means for disposing the various strips into a substantially vertical plane are best shown in Figs. 47 and 48. Therein 30, 30 represent the side frame parts of the machine. Disposed transversely across and resting upon the top of the side frames is a plate 340. Fixed to plate 340 are a number of tubular members 341 which extend upwardly at an angle, being spaced apart to provide a plurality of intervening spaces 342. The strips emerging from the die set in section H, Figs. 15 and 47, are twisted to a substantially upright position and are confined in that generally upright position by contact with the confronting portions of the adjacent tubular members 341, as best illustrated in Figs. 47 and 48.

It will be understood that these strips, in the first instance, are manually twisted and placed in position between the various members 341, but that after the machine has been set up for operation in the forward movement of the web, the various strips are guided and at the same time spaced laterally of the machine by the members 341.

In order to permit insertion of the advancing ends of the strips into the slots in the folded blank, it is necessary to align the strips accurately with the registering slots in folded blank. This mechanism is generally located at section J, Fig. 15.

Partition strip advancing and inserting mechanism, section J, Fig. 15

The mechanism for performing these functions is best illustrated in Figs. 29, 35, 49, 50, 51, 52 and 53. The strip advancing mechanism comprises a carriage which, as a whole, bears the reference numeral 350, which is mounted for sliding movement longitudinally of the machine frame. Carriage 350 is mounted for sliding movement on side rails 351 which are fixed in longitudinally spaced cross members 352—352A attached to the machine frame. For reciprocating the carriage 350 there is provided an eccentric 353 mounted on shaft 35 (Fig. 49A). Eccentric 353 actuates lever 354, swinging it between the full and dotted line positions shown in Fig. 49A through the medium of the pivot 355 connected to member 356 mounted on the eccentric arm 358. The spring assembly 357 serves as a cushion at opposite ends of the stroke of the lever 354, only in the event the cross partitions become jammed in section J. In that event pressure of sufficient amount will be applied to lever 354 and through it to member 356 to compress spring 357 until the movable pin 357P of electric switch 357X, which is carried by member 356, engages the washer 358W, thus actuating the switch which functions to stop the machine.

The upper end of lever 354 is connected to a pair of links 359, the other ends of which are pivotally connected to the horizontally disposed rod 360 which, in turn, is slidably mounted for movement through the cross member 352, before described.

Fixed to move with the actuating rod 360 is a cross member 362, the opposite ends of which are mounted for sliding movement on the longitudinal rails 351. In this way member 362 can be reciprocated between the full and dotted line positions shown in Fig. 49A, this distance being slightly greater in extent than the length of one of the cross partition walls 24, for reasons which will shortly be explained.

Secured to and upstanding from the slidable cross member 362 is a plurality of standards 365 which are associated with certain longitudinally disposed guide members 366. Since these members 365 and 366 are alike, a detailed description of one will suffice for all. The specific construction is best shown in Fig. 51. Each guide rail 366 comprises a vertical wall portion 367 terminating at the top and bottom in portions 368 which are provided with vertical grooves 369 of a size snugly to receive marginal portions of one of the partition strip members 23 when vertically disposed therein. The inner face 370 is provided with a pair of spaced parallel grooves 371, the purposes of which will shortly appear.

Each upstanding member 365 includes upper and lower spaced lugs 372 between which there extends a vertical guide member 373. Mounted on the guide member 373 is a rockable member 374 which carries two pins 371P, the ends of which project into the grooves 371 in the guides 366. As will be seen shortly, these pins project into the upper and lower central slots 377 and 378 of the cross partition portions of the strips so that as the carriage 350 moves toward the folding section E (Fig. 15), the strips are all advanced a distance equal to the length of the cross partition, one of which is shown in Fig. 55, but on the return movement the stroke is slightly greater.

In the movement of the carriage 350 toward the wrapper folding section E (Fig. 15), which is in the direction of the arrow, Fig. 52, the member 374 tends to rotate in a clockwise direction which movement, however, is limited by the adjacent portion 380 of the member 365. This provides for the positive forward feed of the strip in one direction. On the return movement of the carriage 350 the member 374 will first rotate in a contra-clockwise direction until the pins 371P move out of the slots 377, 378 and engage in the exposed face portion of the strip which is positioned in the guide 366. On the return movement the pins 371P slide along the exposed face of the strip and move rearwardly to a point slightly beyond the set of slots 377, 378 in the next adjacent trailing part of the strip.

As the carriage again moves from the dotted position, Fig. 49A, to the full-line position, the pins 371P slide on the exposed face of the strip until they reach the slots 377, 378, at which time, after slight rotation of the dogs 374 under the action of torsion springs 357, the pins 371P enter the slots in the partition strips 23. Rotation of dogs 374 under the action of torsion spring 375, as before explained, is limited in one direction. As carriage 350 advances toward folding section, the strips 23 are all simultaneously advanced in their guides 366 a distance equal to the length of one cross partition.

In order to lock the strips against movement in a direction away from the folding section as the feed carriage 350 returns in that direction, there is provided the mechanism best shown in detail in Figs. 50, 53.

On the cross member 352A which is fixed to the side members 30, 30 of the machine frame, is mounted a plurality of levers 400 pivoted at 401 to the cross member 352A. The upper arm of each of the levers 400 carries a member 402 which is adjustable to a limited extent in a direction toward the exposed face of the adjacent strip 23. The lower arms of a group of levers 400 to the left of center (Fig. 50) are connected to a link 403, and those on the right-hand side of center are connected to a link 404. For actuating these levers there is provided a cam 405 fixed to shaft 39, said cam having a groove 406 in its periphery. As shaft 39 rotates, lever 407, which is pivoted at 408, is actuated and, through link 409 and arm 410 of the lever 407, moves the links toward and away from each other, thus alternately bringing the contact members 402 into binding engagement with the strips 23 and then into position free of contact therewith. Contact members 402 engage the strips to hold them against reverse movement on the backstroke of the dogs 374.

The forward end of the strip guides 366 terminates a short distance from the vertical plane in which the upfold and downfold blades 17 and 250 reciprocate. In this space there is located the strip cut-off mechanism which will shortly be described. However, it will be understood that the advancing ends of all strips 23 are projected into the registering sets of slots 20 in the folded wrapper blank before they are severed from the remainder of the strips (see Fig. 6). The upfold blade 17 will at that time be in its upper position between the two folds or plies of the wrapper. However, the slots 410 in blade 17 are at that time aligned with the registered sets of slots 20 in the folded blank so that the advance edges of the strips can pass therethrough and into the slots of the wrapper blank.

The details of the cut-off mechanism are best shown in Figs. 29, 35, 39, 40, and 41. A stationary blade 411 extends across the machine, being fixed to frame part 352. It contains a plurality of vertically disposed spaced slots 412 (see Fig. 40) which are aligned with the slots 410 in the upfold blade 17. A blade 415 is mounted against one face of the fixed blade 411, blade 415 containing a plurality of slots 416 which in one position of blade 415 register with slots 412 in the stationary blade and in another are offset therefrom, as shown in Fig. 40. When said slots are aligned, the strips 23 can pass therethrough, and when the movable member moves to the disaligned position, a shearing action occurs which serves to sever the cross wall partition portion of each strip which is disposed in the folded blank from the remainder of each strip.

It should here be noted that breast means 260, before mentioned, comprises a plurality of spaced parts which provide slots that are aligned with the slots 412 of the fixed blade 411 and with the slots 410 in the upfold blade.

For actuating the movable blade, there is provided a cam 420 mounted on cross shaft 35 (see Fig. 39), the cam having a cam groove 421 in the periphery thereof. A shaft 422 is rotatably mounted in bearings 423 carried by the machine frame. At one end, shaft 422 has an arm 424 which carries at its lower end a follower portion 425 which rides in the cam groove 421. At the other end is a crank arm 426 having a crank pin 427 which projects into an opening in the movable cutter-blade unit. Obviously, rotation of cam 420 causes rocking movement of shaft 422 and reciprocating movement of the movable blade on the face of the stationary blade. The operation of these parts is, of course, properly timed with respect to the other associated parts of the machine.

*The operation of the downfold blade and spreader means associated therewith*

Figs. 6, 7, 8, 9, 17, 18, 29A, 30, 35, 36, 37, and 38 show in detail the parts functioning in connection with these operations.

Previously in connection with Fig. 29A and other views, the mechanism for raising and lowering the upfold blade 17 has been described.

Prior to the time the downfold blade engages the folded blank, the parts will be generally in the position shown in Fig. 6. Prior to the time the lower edge of the downfold blade engages the wrapper blank at the median fold line, the lower blade will have been lowered and withdrawn from the position shown in Fig. 6, and a group of fingers 450 will have been disposed in a position under the lower edges of the folded blank 10 to support the blank and to prevent downward movement of the blank as a whole as the downfold blade engages the upper folded portion of the blank and continues its further downward movement from the full-line position to the dotted-line position, Fig. 7. The construction and actuation of fingers 450 will be described later.

As the downfold blade 230 moves downwardly, the spreader member 250, which is also slidably mounted on the same posts 231 on which the blade 230 is mounted, moves downward. However, there is no positive connection or actuator causing member 250 to move downwardly; but since it is not positively supported, its weight and the down movement of the downfold blade cause it to be lowered. As the lower edge of the downfold blade engages the topfold of the blank and continues its travel downwardly, the applied pressure acts to spread the blank walls, the upper portions being engaged with the angularly disposed portions 451 of the spreader 250. This causes the blank to assume the shape shown in full lines in Fig. 7. The spreader 250 moves downwardly with the blade 230 but a short distance further, as indicated by dotted lines in Fig. 7, at which point the lower end edges engage fixed collars 231X on the posts 231 (see Fig. 30). As downward movement of the blade 230 continues, it disposes upper portions of the folded blank inwardly, as indicated by the dotted lines (Fig. 7A). Further downward movement of downfold blade 230 continues until it reaches its lowest position, as indicated in Fig. 8. This results in infolding of more of the upper walls of the wrapper blank.

In this movement the central portions 377C (Fig. 55) of the cross portions pass into the slots 20A and 20B (Fig. 2) which are at this time arranged in sets of registering slots, part on each side of the median fold line 11 of blank 10. As finally disposed, the offset portions 20C of slots 20A will project across the edge portion 377E of slot 377 and serve to lock those partitions in place.

The two central strips 23 enter the slots 20B which do not have the offset portions which slots 20A embody. The purpose of having closely arranged pairs of slots in the middle of the blank 10 (Fig. 2) is to permit the carton to be divided into two parts, each containing six cells.

The Cormier Patent 2,134,860 discloses an egg carton of the general type herein disclosed, although it differs in some specific respects, as a comparison of the formation of the slots in the wrapper blanks will show.

On the up movement of the downfold blade, pairs of members 230R fixed to the lower corners of the blade 230 (Figs. 18, 30) pass through openings 250A in member 250 until the upper edges of 230R engage the portion 250B defining the upper part of the openings 250A, as appears in dotted lines in Fig. 18. Further upward movement of blade 230 then carries member 250 with it until the parts come to rest at the location shown diagrammatically in Fig. 6.

*Mechanism associated with ejection section K*

As explained in connection with the assembly of the partitions with the wrapper blank, fingers 450 are positioned, as shown in Figs. 7, 8, 35, and 36, to prevent movement of the assembled unit downwardly. The fingers 450 also serve another purpose, i.e., to move the assembled unit from the upright position to a generally horizontal position, at the same time advancing the upper part of the folded unit so that the upper marginal portions thereof are disposed between the upper and lower feed rolls 500 and 501 (see Fig. 59).

The fingers 450 are fixed at one end to a bar 502 which at its ends carries rollers 503. Bar 502 adjacent its ends is mounted to slide on rails 504 which are carried in bracket portions 505 of the assembly 506, shown in Fig. 44.

Assembly 506 comprises the brackets 505 and the connecting tubular member 507 to which is connected an actuator arm 508. Tubular member 507 is rockably mounted on a cross shaft 509 fixed at its end in two spaced brackets 510, the latter being fixed to the angle bar 511 of the frame (see Fig. 35.)

Also mounted in brackets 510 is a second cross shaft 512 on which is fixed a lever 513. Fixed at the ends of shaft 512 are depending arms 514 connected by links 515 to the lower ends of curved levers 516, which are pivoted at the top at 517 to the brackets 510. Levers 516 contain a curved cam slot 518 to receive the rollers 503 at the ends of bar 502.

To cause swinging movement of lever 516, one end of link 519 is operatively connected to arm 513 and the other end to the top end of a lever 520, the bottom end of which is pivoted at 521 to a bearing block 522 fixed to a part of the machine. The lever 520 at a point between its ends carries a roller 523 which travels in the cam groove 524 of cam 525, the latter being fixed to a cross shaft 526. Cross shaft 526 is driven continuously from a chain operatively trained over sprockets fixed to shaft 35 and 526. By this mechanism, fingers 450 are shifted between the full-line and dotted-line positions (see Fig. 38), which is necessary to dispose said fingers in a position to support the folded blank at one time and to remove from that position to enable reciprocating movement of the upfold blade.

To swing upwardly the assembly 506 and the parts carried thereby and to eject the assembled wrapper sheet-partition, an adjustable link 527 is connected at one end to arm 508 on shaft 507 and at the other end to the top end of a lever 528, which is pivoted at 529 to a bearing block 530 fixed to the machine frame (see Fig. 35). Lever 528 carries a roller 531 operating in a cam groove 532 in cam 533 fixed to the constantly rotating shaft 526. The mechanism just described serves to swing the fingers 450 from a substantially horizontal position to a substantially vertical position at a higher elevation. The path of movement of the rollers 503 on the ends of bar 502 is shown diagrammatically in Fig. 38. It should be understood that Fig. 37 illustrates an intermediate position in the downward swing of the fingers 450.

As a further part of the means for directing the folded assembled unit from the vertical to the horizontal position, there is provided a plurality of upper fingers 540 all connected at their upper ends to a crossbar 541 of an inverted U-shaped frame 542. The U-shaped frame is mounted for sliding movement longitudinally of the frame on rods 543 at each side of the machine. To provide this sliding movement the mechanism is best shown in Fig. 43. This comprises a cam 550 fixed to shaft 526 and a lever 551 pivotally connected of 552 to a bracket fixed to a part of the main frame of the machine. Lever 551 carries a roller 553 operating in cam groove 554 of cam 550.

Lever 556 is pivoted at its bottom end on shaft 509, its upper end being pivotally connected between a pair of links 557 which are pivotally connected to the sleeves 558 on rods 543. A link 560 connects lever 551 and lever 556. Rotation of cam 550 causes movement of member 558 between the full- and dotted-line positions shown in Figs. 35 and 43. Such movement functions to move fingers 540 between the full- and dotted-line positions shown in Figure 35. The downfold blade 230 has a plurality of slots 561 through which the fingers 540 project when moving to the dotted-line position best shown in Fig. 35. The spreader member 250 also contains a plurality of slots 562 for the same purpose. The slots 563 (see Figs. 17 and 30) are for the purpose of accommodating parts of the cross partition when the downfold blade is in its lower position.

As the fingers 450 push the assembled unit upwardly, the upper folded part of the blank engages the underside of the fingers 450 and are deflected from the vertical to the horizontal, thereby positioning the now advancing marginal portion between the feed rolls 500, 501 which deliver the unit to the pick-out section L (Fig. 15).

In the course of this movement, the unit passes between upper and lower guide fingers 570, 571. Also in the course of this movement, the partitions are collapsed upon opposite sides of the folded wrapper blank to the condition shown in 62 and 65.

*Mechanism for collapsing partitions*

The mechanism for this purpose is best shown in Figs. 62, 63, and 64. Mounted for rocking movement on rods 543 are double arms 575. Cross connecting the outer ends of the double arms 575 are members 576. In the open condition shown in Fig. 63, an open frame is provided of a size sufficient to accommodate the wrapper unit with the partitions extending at right angles to the sides of the wrapper. By swinging the double arms to the position shown in Fig. 62, the cross partition collapsed, as before explained.

For actuating the collapsing mechanism, there is provided a cam 577 mounted on shaft 526. An adjustable link 578 is connected at its upper end to one of the double arms 575 at 580, and at its lower end to a link 581 pivotally connected to the frame of the machine at 582. Link 578 carries a roller 583 which rides in groove 584 of cam 517. Hence rotation of cam 517 results in the swinging movement before described.

For driving the feed rolls 500, 501, there is provided a sprocket 526A on shaft 526. Also on shaft 501A of the lower feed roll 501 is a sprocket 527, around which is trained a chain 590. Also fixed to shaft 501A of the lower roll 501 is a gear 591 which meshes with and drives a gear 592 fixed to the end of shaft 500A of the upper roll 500. The shafts just mentioned are journalled in the head frames 593 which are fixed to and upstand from the members 30 of the machine frame. Mounted for rocking movement in the upper portions of the head frame 593 is a shaft 600. Shaft 600 has an arm 601 fixed thereto (see Fig. 78) to which is connected the upper end of a connecting rod 602. The lower end of rod 602 is connected to the strap 603 of eccentric 604 mounted on shaft 526. Shaft 600 supplies the motions for the pick-out mechanism L of Fig. 15, which will now be described.

*Pick-out section L*

In this connection see Figs. 59, 60, 61, and 66 to 77, inclusive.

On shaft 600 is fixed an arm 625. One end of shaft 626 is mounted for rotation in the arm 625, the other end being rotatably mounted in spaced head pieces 627 (see Fig. 61). The shaft 600 passes through said head pieces whereby the head pieces can rock with the shaft 600.

Loose on shaft 600 is a member 630 having a gear segment 631 meshing with a gear segment 632 of member 633 keyed to shaft 626. At one end of gear segment 632 is a notch 634. A latch 635 is mounted for rocking movement at 636 on arm 625. One arm of the latch engages in said notch, and the other arm of said latch is engaged by a spring 637 which tends to swing the latch 635 in a direction to maintain the end in said notch.

Member 630 has an arm 630A to which is connected a tension spring 640, the other end of which is fixed to a part 641 of the head frame.

An angle bar 642 extends between the head frames and connects them together. Bar 642 carries an adjustable stop 643, which in rocking movement of arm 625 is engaged by the one arm of the latch 635 so as to withdraw the other end from the notch in member 633. When this occurs, spring 640 contracts, thus causing member 630 to turn the member 633 and its shaft 626.

To shaft 626 is fixed an arm 650 having a slot 651 therein. One of these arms 650 is located adjacent each head piece 627.

A member 652, shown in perspective in Fig. 77, carries a roller 653 which rides in the slot 651 of arm 650.

Gripper finger rods 660, 661 have their upper ends slidable through the associated head pieces on the opposite sides of shaft 600.

The upper end of rod 660 is connected to a cross pin 662 in member 652. The upper end of rod 661 is connected to a block 663 which slides in slots 664 in member 652.

Member 652 has arm portions 670, 671.

On shaft 626 is a lever 672 having three arms 673, 674, 675. A spring 676 is interposed between arm 673 and the shaft 600, tending to swing the arm 674 into a position to be engaged by the arm 670 of member 652.

On the lower ends of the gripper finger rods 660, 661 are upper and lower fingers 700, 701.

A tension spring 702 is connected at one end to rod 660 and at the other end to rod 661 and tends to move the fingers 700, 701 together.

The cam shaft 626 also carries on it, but free to revolve, a lever and pawl assembly 672. Members 652 have on one side-face a notch 670X to engage pawl portion 674 of lever 672 when at the top of the raise of members 652, as shown in Fig. 75. This interference by pawl 674 during the return stroke, as shown in Fig. 76, causes members 672 to tilt on the downstroke of cams 650, thus causing clamps 700, 701 to open against spring 702 until such time as pawl 672 strikes the stop 672S on frame 642, thus tripping pawl 672 and causing spring 702 to close clamps 700, 701 on an assembled carton ready for the delivery stroke, as in Fig. 76.

On the other faces of members 652 are extended bevel faces to engage stops 652X mounted on cross frame member 642. During the delivery stroke, as in Fig. 76, members 652 are forced to tilt, thus opening clamps 700, 701 and releasing the carton at the proper point on the upper lap of the belt of the delivery section. This action is shown in Fig. 69. The stops on frame 642 are adjustable so that the carton can be released at any point during the delivery stroke.

By reference to Figs. 66, 70, and 73, it will be seen that the cam shaft 626 is carried in an arc about the center line of the main shaft 600. Gear quadrant member 630 is mounted on the main shaft 600 but is free to revolve. Gear quadrant member 633 is fixed to the cam shaft. In Fig. 66 it will be noted that pawl 635 is engaged in the notch in member 633. This pawl prevents relative rotation of gear quadrants on members 630, 633 during the delivery stroke (Fig. 76). Fig. 70 shows that this action has raised the stop face on 630H off the frame member 641 and has stretched spring 640. When pawl 635 strikes the stop on angle 642, spring 640 is released to create a rotating action of gear quadrant on member 633, thus rotating the cam shaft 626. This action is repeated for each cycle of operation to the position at Fig. 66 when pawl 635 is re-latched. On the return stroke of this cycle, as shown in Fig. 70, gear on member 630 is held stationary against the frame 641, thus causing gear on member 633 to rotate back to latching position (Fig. 66).

Figs. 67, 71, and 74 illustrate the action created by the rotation of the cam shaft 626. Cams 650 are permanently fastened to the cam shaft 626 and operate to raise and lower parts 652. Parts 652 have fastened in them at their center lines, cam followers which run in slots in cams 650, thus transferring their action to parts 652. Parts 652 carry, in pivot mounts, rods 660, 661 which slide in blocks to whose ends are affixed clamps 770, 701. Fig. 76 shows the center-line path of clamps or fingers 700, 701 created by action of the parts shown in Figs. 66, 70, 73, 67, 71, and 74.

*The delivery section*

From the description of the pick-out section it will be understood that the assembled cartons with the cross walls collapsed are successively placed upon the upper lap of the belt 750 (see Figs. 15, 56, 59, 78, 79) which, moving in the direction of the arrow (Fig. 56), carries the assembled cartons away from the pick-out section.

The delivery section comprises a frame including side members 751, the ends nearest the pick-out section being suported from the cross member 752 of the main frame. The other ends are supported from the floor by legs 753. A number of cross members 754 are supported from the longitudinal frame members 751, one thereof being shown in Fig. 59. On the cross members 754 there is supported a plate 755 on which the underface of the upper lap of the belt rides and which serves to support the belt.

For advancing the belt in a step-by-step manner, a roller 756 is mounted on the cross shaft 757, the latter being suitably mounted in the frame for rotation. On shaft 757 is a one-way clutch 758 actuated by an arm 759, the latter being given a swinging motion by eccentric 760 mounted on shaft 526 (see Fig. 78) through connecting link 761.

Endless belt 750 passes around roller 756, around roller 765 on cross shaft 766, and around roller 767 at the opposite end of the delivery section. Roller 767 is mounted on a cross shaft 768 which is mounted for rotation in the frame of the delivery section.

Shaft 757 on the far side of the machine (see Fig. 56) has fixed thereto a sprocket 780. A chain 781 is trained around a sprocket 782 on a stud shaft 783 rotatably mounted in an upstanding member 784 fixed to member 785 carried by the machine frame. This chain also passes around an idler sprocket 786. Hence step-by-step rotation of shaft 757 causes step-by-step rotation of stud shaft 783. A gear 790 is fixed to stud shaft 783 which meshes with a gear 791 fixed to cross shaft 792, which is journalled in the members 784 and 784A.

Fixed to rotate with shaft 792 are a plurality of pulleys 793. Mounted for rocking movement on shaft 792 are arms 794 in the outer ends of which are rotatably mounted pulleys 795. Endless belts 796 pass around and into operative contact with pulleys 793 and 794 and are driven in the direction of the arrows (see Fig. 56).

The lower laps 797 are pressed into engagement with the assembled collapsed carton blanks carried by the main conveyor belt and, moving in the same direction as the upper lap of the main conveyor belt, aid in moving the assembled cartons to the open part of the upper lap of the main conveyor belt where the operator can conveniently remove them.

The arms 794 are provided with weights 800 which are adjustable longitudinally of the arms 794, whereby the pressure of the lower lap of belt 796 against the cartons can be adjusted to produce the most satisfactory operating conditions.

A strap member 801 (Fig. 56) passes across the upper faces of the lower laps of belt 796 under the arms 794. Strap member 801 has depending arms 802 which are attached to the side members 785 for vertical adjustment. In this way the upward movement of the belts is positively limited.

*Further remarks*

In connection with the members 400 (Fig. 50), it should also be stated that they serve to hold the partitions strips firmly against longitudinal movement at the time the strip portions which have been inserted into the slots of the wrapper blank are severed from the remainder of the strips.

The guide members 366 are flared at 367E (see Fig. 29) to aid in directing the strips into the grooves 369 of the guides.

Below the lower fixed die member (Fig. 14) there is a conduit 321A. The upper end surrounds the lower die member, but along one upper side is spaced from the die member to provide a gap 321B. At the other end of the conduit there is arranged an exhaust blower discharging to atmosphere. The action when the exhaust blower is in operation is to entrain air through the gap 321B and discharge it to atmosphere through the blower end. As the waste material from the web falls during a punching operation, it is carried by the air stream and discharged. In this way danger of clogging the dies is avoided and at the same time there is not sufficient down pull on the stock passing through the die to prevent the advancement toward the folding or assembly position as before explained. A similar exhaust system, though not shown, is also associated with the die set that provides the slots in the wrapper blank in section C.

In connection with the description of the downfold blade (Fig. 17), it was explained that slots 561 accommodate the fingers 540. It should also be mentioned that the slots 561 are wide enough so that they will also accommodate portions of the cross partitions which are aligned with these slots.

We claim:

1. A machine for producing cartons by assembling cross partitions with the body of a carton having two slotted plies in substantially flatwise relation to one another to provide a plurality of sets of registering slots therein, comprising in combination means for holding said two-ply body in assembly position, said holding means including structure interposed between the plies of the carton body and serving to hold them in spaced relation, means for advancing a web of sheet material, means for dividing said web of sheet material into a plurality of strips in which each strip comprises a plurality of cross partition portions, means for aligning said strips with said sets of slots in the two-ply body, means for projecting the advance end of each strip into a set of registering slots in the two-ply carton body while said plies are held in said spaced relation and means for severing the cross partition portions that are disposed in said slots from the remainder of the strips.

2. A machine for assembling cartons comprising in combination means for folding a slotted wrapper blank folded along an intermediate line to constitute two wing portions interconnected along the fold line so that the inner faces are in confronting relationship and the wings provide a plurality of sets of registering slots extending in a direction substantially perpendicular to the fold line, said folding means including structure interposed between the wing portions of the wrapper sheet and serving to hold the wing portions in spaced relation, means for positioning the folded blank so that the wings extend in a substantially vertical direction, means for advancing a plurality of horizontally disposed strips of sheet stock, each strip comprising a plurality of cross wall portions, means for twisting the strips to align the forward edges thereof with said sets of registering slots in the wrapper wing portions, means for advancing said strips to dispose a cross wall portion of each strip in a set of registering slots in said folded wrapper blank while said wing portions are held in said spaced relation, means for severing the said cross portions that are disposed in said slots from the remainder of the strips, means for withdrawing said interposed structure and means for infolding a portion of the wrapper blank to interlock the same with the central portions of at least some of the cross wall portions.

3. A machine for assembling cartons comprising in combination means for holding a wrapper blank folded along an intermediate line to constitute two wing portions interconnected along the fold line with the inner faces in confronting relationship, whereby said wing portions present a plurality of sets of registering slots extending in a direction substantially perpendicular to the fold line, said means for holding the wrapper blank folded, comprising structure interposed between the wing portions of the wrapper blank and serving to hold the wing portions in spaced relation, means for supporting a web of sheet stock, means for advancing said web and for progressively dividing the leading portion thereof into a plurality of strips, each strip formed to comprise a plurality of cross wall portions, means for aligning the forward edges of said strips with said sets of registering slots in the wrapper wing portions, whereby the leading portions of said strips are disposed with a cross wall portion of each strip in a set of said registering slots while said interposed structure is in position between the wing portions of the wrapper blank and means for severing the said cross portions that are disposed in said slots from the remainder of the strips.

4. A machine for assembling cartons comprising in combination means for holding a wrapper blank folded along an intermediate line to constitute two wing portions interconnected along the fold line with the inner faces in confronting relationship, whereby said wing portions present a plurality of sets of registering slots extending in a direction substantially perpendicular to the fold line, said means for holding the wrapper blank folded, comprising structure interposed between the wing portions of the wrapper blank and serving to hold the wing portions in spaced relation, means for supporting a web of sheet stock, means for advancing said web and for progressively dividing the leading portion thereof into a plurality of strips, each strip formed to comprise a plurality of cross wall portions, means for aligning the forward edges of said strips with said sets of registering slots in the wrapper wing portions whereby the leading portions of said strips are disposed with a cross wall portion of each strip in a set of said registering slots while said interposed structure is in position between the wing portions of the wrapper blank, means severing the said cross portions that are disposed in said slots from the remainder of the strips, means for withdrawing said interposed structure from between the wing portions and means for infolding a portion of the folded wrapper blank to interlock the same with the central portion of at least some of the cross wall portions.

5. In a machine for assembling cartons consisting of a slotted body wrapper sheet and individual cross partitions, the combination of means for positioning a slotted flat body wrapper sheet at an assembly station, means at the assembly station for folding the slotted flat body wrapper sheet along an intermediate fold line to provide two substantially parallel wing portions interconnected along the fold line whereby said wing portions present a plurality of sets of elongated registering slots extending in a direction substantially perpendicular to the fold line, said folding means including structure interposed between the wing portions of the body wrapper sheet and serving to hold them in spaced relation, means at said station for supporting a plurality of cross partitions in alignment with said sets of elongated registering slots, and means for advancing said cross partitions to dispose one thereof in each of a plurality of sets of elongated registering slots in the wing portions of the folded body wrapper sheet at said station while said wing portions are held in said spaced relation.

6. In a machine for assembling cartons consisting of a slotted body wrapper sheet and individual cross partitions, the combination of means for positioning a slotted flat body wrapper sheet at an assembly station, means at the assembly station for folding the slotted flat body wrapper sheet along an intermediate fold line to provide two substantially parallel wing portions interconnected along the fold line whereby said wing portions present a plurality of elongated registering slots extending in a direction substantially perpendicular to the fold line, said folding means including structure interposed between the wing portions of the body wrapper sheet and serving to hold them in spaced relation, means for supporting a plurality of strips each comprising a plurality of cross partition portions with the leading cross partition portion of said strips in alignment with said sets of registering slots, and means for advancing said strips to dispose a cross partition of each strip in a set of registering slots in the wing portions of the folded body wrapper sheet at said station while said wing portions are held in said spaced relation, and means at said station for severing the cross partition portions that are disposed in said slots from the remainder of the strips.

7. In a machine for assembling cartons consisting of a slotted body wrapper sheet and individual cross partitions, the combination of means for positioning a slotted flat body wrapper sheet at an assembly station, means at the assembly station for folding the slotted flat body wrapper sheet along an intermediate fold line to provide two substantially parallel wing portions interconnected along the fold line whereby said wing portions present a plurality of sets of elongated registering slots extending in a direction substantially perpendicular to the fold line, said folding means including structure interposed between the wing portions of the body wrapper sheet and serving to hold them in spaced relation, means for advancing a web of sheet material from a position spaced from the assembly station, means for converting said web of sheet material into a plurality of cross partition portions, means at said station for aligning the leading cross partition portions of said strips with said sets of registering elongated slots, and means for advancing said cross partition portions of said strips to dispose one thereof in each of a plurality of sets of registering slots in the wing portions of the folded body wrapper sheet at said station while said wing portions are held in said spaced relation, and means for severing the cross partition portions that are disposed in said slots from the remainder of said strips.

8. In a machine for assembling cartons consisting of a slotted body wrapper sheet and individual cross partitions, the combination of means for positioning a slotted flat body wrapper sheet at an assembly station, means at the assembly station for folding the slotted flat body wrapper sheet along an intermediate fold line to provide two substantially parallel wing portions interconnected along the fold line whereby said wing portions present a plurality of sets of elongated registering slots extending in a direction substantially perpendicular to the fold line, said folding means including structure interposed between the wing portions of the body wrapper sheet and serving to hold them in spaced relation, means for advancing a web of sheet material from a position spaced from the assembly station, means for converting said web of sheet material into a plurality of cross partition portions, means at said station for aligning the leading cross partition portions of said strips with said sets of registering elongated slots, and means for advancing said cross partition portions of said strips to dispose one thereof in each of a plurality of sets of registering slots in the wing portions of the folded body wrapper sheet at said station while said wing portions are held in said spaced relation, means for withdrawing said interposed structure, means at said station for infolding a portion of the slotted folded body wrapper sheet to interlock with the central portions of at least some of the cross partition portions disposed in said sets of registering slots, and means for severing the cross partition portions that are disposed in said slots from the remainder of said strips.

9. In a machine for assembling cartons consisting of a slotted body wrapper sheet and individual cross partitions, the combination of means for positioning a flat body wrapper sheet at an assembly station, means at the assembly station for folding the slotted body wrapper sheet along an intermediate hold line to provide two substantially parallel wing portions interconnected along the fold line whereby said wing portions present a plurality of sets of registering slots extending in a direction substantially perpendicular to the fold line, said folding means including structure interposed between the wing portions of the body wrapper sheet and serving to hold the wing portions in spaced relation, means at said station for supporting a plurality of cross partitions in alignment with said sets of registering slots, means for advancing said cross partitions to dispose one thereof in each of a plurality of sets of registering slots in the wing portions of the folded body wrapper sheet at said station while said wing portions are held in spaced relation, and means at said assembly station for infolding a portion of the slotted folded body wrapper sheet to interlock with the central portions of at least some of the cross partitions disposed in said sets of registering slots.

10. The combination set forth in claim 9 in which the means at the assembly station for infolding a portion of the slotted body wrapper sheet to interlock with the central portions of at least some of the cross partitions disposed in the said registering slots comprises reciprocating structure which engages the fold line portion of the folded body wrapper sheet and moves to a position substantially spanning the central portion of the cross partitions at one end of its reciprocatory path.

11. The combination set forth in claim 10 in which the reciprocating structure comprises a blade having slots which extend inwardly of that marginal portion thereof which engages the folded body wrapper sheet during the infolding operation.

12. The steps in the method of assembling cross partitions in a slotted wrapper body blank, comprising providing a once-folded wrapper blank having two substantially parallel wing portions interconnected along a fold line with said wing portions presenting a plurality of pairs of elongated registering slots extending in a direction substantially perpendicular to the fold line, internally supporting the said wing portions so that the confronting faces thereof are held in spaced apart relation, and in inserting a cross partition through each of said pairs of registering slots whilst the wing portions of the blank are internally supported in said spaced apart relation.

13. The steps in the method of assembling cross partitions in a slotted wrapper body blank, comprising providing a once-folded wrapper blank having two substantially parallel wing portions interconnected along a fold line with said wing portions presenting a plurality of pairs of elongated registering slots extending in a direction substantially perpendicular to the fold line and spaced therefrom, and a plurality of slots aligned with said first mentioned slots traversing the fold line, internally supporting the said wing portions so that the confronting faces thereof are held in spaced apart relation, and in inserting a cross partition through each of said registering slots whilst the wing portions of the blank are internally supported in said spaced apart relation, withdrawing the said internal support and in infolding portions of the once-folded blank to dispose the original fold line thereof between the remaining wing portions of the folded blank and to a position to interlock the cross partitions with portions defining the slots which traverse the initial fold line.

14. The steps in the method set forth in claim 13 including the further step of pressing the wing portions into contact with the internal support while the same is in position and in limiting the movement of parts of the wing portions away from each other upon the withdrawal of said internal support.

15. The steps of the method set forth in claim 13 including the further step of pressing the wing portions into contact with the internal support and in yieldably restraining movement of parts of the wing portions away from each other upon the withdrawal of said support.

16. The steps in the method of assembling cross partitions in a slotted wrapper body blank, comprising providing a wrapper blank having two rows of elongated slots extending in a direction perpendicular to an intermediate line on which the blank is to be folded, being equally spaced therefrom, and the slots of one row being in alignment with those of the other row, folding said blank on said intermediate line and around a slotted plate to dispose wing portions of the blank upon opposite sides of the slotted plate and with the slots of one row aligned with those of the other and with the slots in said place, and in inserting a cross partition through each of said registering slots whilst the wing portions of the blank are internally supported by said slotted plate.

17. A machine for partially assembling a cellular carton of the type which is characterized by a foldable body-forming blank and a plurality of spaced cross-partition blanks which are adapted to be positioned in interlocking relation in aligned slots in the body-forming blank, said machine comprising means for positioning such a blank at an assembly station while in substantially flat form, means for folding said flat blank along a median line to provide a once-folded blank having substantially parallel wing sections each having slots therein, with the slots in each wing portion aligned with slots in the other wing portion, said folding means comprising a slotted blade and means for reciprocating said blade in a plane substantially normal to the plane of the flat blank so that when the blade is in one position of its movement it will be interposed between the wing portions of the blank with the slots in the blade in alignment with the slots in both of said wing portions, and means for inserting cross partitions through said slots when the blade is in the said one position.

18. The arrangement set forth in claim 17 including further means for infolding portions of the once-folded blank to dispose the original fold line between the remaining wing portions of the once-folded blank and to a position to interlock the cross partitions with portions with slots which traverse the initial fold line of the blank, said infolding means comprising a blade positioned on the opposite side of the blank from the blade of claim 17 and adapted to reciprocate in a plane aligned with the plane of said blade as defined in claim 17, means for causing reciprocation of the infold blade between an inner position wherein a portion of the blade extends across a substantial portion of the cross portions and one outwardly thereof.

19. A machine for infolding portions of a once-folded body blank having a hinge portion and substantially parallel wing portions, the latter provided with aligned slots through which cross partitions extend and comprising means for holding the blank in a predetermined plane, a blade structure positioned to reciprocate substantially in the plane of said blank, means for causing reciprocation of said blade so that in the movement thereof toward the blank an edge portion of the blade engages the hinge portion of the blank and moves to a position traversing a major part of the cross partition, said infold blade being provided with a means floatingly positioned on the marginal end portion of the blade and operative to confine wing portions of the blank during an initial portion of the infolding operation to permit projection of the blade marginal portion in the further infolding operation.

20. The arrangement set forth in claim 19 including further means for returning said floatingly positioned means to initial position on the blade after each infolding operation.

21. The arrangement set forth in claim 19 wherein the means floatingly mounted on the blade comprises portions diverting outwardly from the adjacent marginal end portion of the blade.

References Cited in the file of this patent

UNITED STATES PATENTS

| | | |
|---|---|---|
| 2,195,916 | Brown | Apr. 2, 1940 |
| 2,636,423 | Cunningham | Apr. 28, 1953 |
| 2,642,786 | Gilchrist | June 23, 1953 |
| 2,655,081 | Burger | Oct. 18, 1953 |
| 2,746,362 | Vahle | May 22, 1956 |

FOREIGN PATENTS

| | | |
|---|---|---|
| 59,458 | Denmark | Feb. 2, 1942 |